US012391841B2

(12) United States Patent
Garnier et al.

(10) Patent No.: US 12,391,841 B2
(45) Date of Patent: Aug. 19, 2025

(54) HYBRID UV-LED RADIATION CURABLE PROTECTIVE VARNISHES FOR SECURITY DOCUMENTS

(71) Applicant: SICPA HOLDING SA, Prilly (CH)

(72) Inventors: Jean Garnier, Corcelles-le-Jorat (CH); Patrick Veya, Aclens (CH); Pierre-Yves Hofstetter, Villars-le-Terroir (CH)

(73) Assignee: SICPA HOLDING SA, Prilly (CH)

( * ) Notice: Subject to any disclaimer, the term of this patent is extended or adjusted under 35 U.S.C. 154(b) by 137 days.

(21) Appl. No.: 18/563,708

(22) PCT Filed: Jun. 8, 2022

(86) PCT No.: PCT/EP2022/065584
§ 371 (c)(1),
(2) Date: Nov. 22, 2023

(87) PCT Pub. No.: WO2022/258704
PCT Pub. Date: Dec. 15, 2022

(65) Prior Publication Data
US 2024/0294790 A1 Sep. 5, 2024

(30) Foreign Application Priority Data

Jun. 8, 2021 (EP) .................................... 21178128

(51) Int. Cl.
*C09D 11/38* (2014.01)
*B41M 3/14* (2006.01)
*B42D 25/40* (2014.01)
*C09D 4/00* (2006.01)
*C09D 7/63* (2018.01)

(52) U.S. Cl.
CPC ............. *C09D 11/38* (2013.01); *B41M 3/144* (2013.01); *B42D 25/40* (2014.10); *C09D 4/00* (2013.01); *C09D 7/63* (2018.01)

(58) Field of Classification Search
CPC ...... C09D 11/30; C09D 11/101; C09D 5/002; C09D 4/06; C09D 4/00; C09D 5/00; C09D 5/006; C09D 7/63; B41M 3/14; B41J 11/00214; B41J 11/0021
See application file for complete search history.

(56) References Cited

U.S. PATENT DOCUMENTS

| 2015/0259565 | A1  | 9/2015  | Veya et al. |
| 2016/0159009 | A1* | 6/2016  | Canale ................. B29C 64/106 522/111 |
| 2019/0345350 | A1  | 11/2019 | Hoggett et al. |
| 2020/0308426 | A1  | 10/2020 | James et al. |

FOREIGN PATENT DOCUMENTS

| CN | 107011768   | 8/2017  |
| EP | 0256170     | 2/1988  |
| WO | 2011120917  | 10/2011 |
| WO | 2014067715  | 5/2014  |

OTHER PUBLICATIONS

Printing Technology, J. M. Adams and P.A. Dolin, Delmar Thomson Learning, 5th Edition, 2002, pp. 359-360.
The Printing Ink Manual, R.H. Leach and R.J. Pierce, Springer Edition, 5th Edition, pp. 58-62.
Printing Technology, J. M. Adams and P.A. Dolin, Delmar Thomson Learning, 5th Edition, 2002, pp. 293-328.
Handbook of Print Media, H. Kipphan, Springer, 2001, pp. 409-422 and pp. 498-499.
Cho J-D et al: "Photo-curing kinetics for the UV-initiated cationic polymerization of a cycloaliphatic diepoxide system photosensitized by thioxanthone", European Polymer Journal, Pergamon Press Ltd Oxford, GB, vol. 41, No. 2, Feb. 1, 2005 (Feb. 1, 2005), pp. 367-374, XP004685612, ISSN: 0014-3057, DOI: 10.1016/J.EURPOLYMJ.2004.10.006 the whole document.
International Search Report and Written Opinion issued with respect to application No. PCT/EP2022/065584.

* cited by examiner

*Primary Examiner* — Thinh H Nguyen
(74) *Attorney, Agent, or Firm* — MUNCY, GEISSLER, OLDS & LOWE, P.C.

(57) ABSTRACT

The present invention relates to the technical field of varnishes for protecting security documents, such as banknotes, against premature detrimental influence of soil and/or moisture upon use and time. In particular, the present invention provides a hybrid UV-LED radiation curable protective varnish comprising:
  a) from about 60 wt-% to about 85 wt-% of either a cycloaliphatic epoxide, or a mixture of a cycloaliphatic epoxide and one or more cationically curable monomers other than the cycloaliphatic epoxide;
  b) from about 3 wt-% to about 15 wt-% of one or more radically curable monomers and/or oligomers;
  c) from about 1 wt-% to about 6 wt-% of a diaryl iodonium salt;
  d) from about 0.5 wt-% to about 3 wt-% of a free radical photoinitiator selected from the group consisting of alpha-hydroxyketones, alpha-alkoxyketones, benzyl diketals, benzoin ethers, phosphine oxides, phenylglyoxylates, and mixtures thereof;
  e) from about 0.01 wt-% to about 5 wt-% of a non-ionic surfactant; and
  f) a photosensitizer of general formula (I)

$$A^1 \underset{L^1}{\overset{}{\longleftarrow}} O \underset{n_1}{\overset{B}{\longleftarrow}} \underset{m}{\overset{C}{\longleftarrow}} O \underset{L^2}{\overset{}{\longleftarrow}} A^2_{n_2} \quad (I)$$

wherein the weight percents are based on the total weight of the hybrid UV-LED radiation curable protective varnish.

15 Claims, No Drawings

HYBRID UV-LED RADIATION CURABLE PROTECTIVE VARNISHES FOR SECURITY DOCUMENTS

FIELD OF THE INVENTION

The present invention relates to the technical field of varnishes for protecting security documents, such as banknotes, against premature detrimental influence of soil and/or moisture upon use and time.

BACKGROUND OF THE INVENTION

With the constantly improving quality of color photocopies and printings and in an attempt to protect security documents such as banknotes, value documents or cards, transportation tickets or cards, tax banderols, and product labels against counterfeiting, falsifying or illegal reproduction, it has been the conventional practice to incorporate various security features in these documents. Typical examples of security features include security threads, windows, fibers, planchettes, foils, patches, decals, holograms, watermarks, security features obtained from security inks comprising security materials such as magnetic pigments, UV absorbing pigments, IR absorbing pigments, optically variable pigments, light polarizing pigments, luminescent pigments, conductive pigments and surface-enhanced Raman spectroscopy particles.

It is known to provide security documents, in particular banknotes, with dirt-repellent protective coatings to extend their life and fitness for circulation. Protective coatings are protective layers facing the environment of the document, which are obtained from thermally (solvent-containing) curable varnishes, radiation-curable varnishes, or combinations thereof.

European patent application publication number EP0256170A1 proposes a protective layer consisting essentially of cellulose ester or cellulose ether for coating a currency paper printed with an ink containing 1-10% by weight of micronized wax. The protective layer is obtained by applying on the surface of the currency paper a solvent-containing varnish by spraying, dipping or roller coating, and curing said varnish with a current of hot air.

The increasing sensitivity of the public to environmental concerns, as well as the necessary responsiveness of the chemical industry to environmental regulations, have motivated the industry to develop radiation curable protective varnishes (i.e. varnishes that are cured either by UV-visible light radiation, or by electron beam radiation) that contain no or a significantly reduced amount of organic solvent (volatile organic components, VOC). Besides being more environmentally friendly than the solvent-containing protective varnishes, the radiation curable protective varnishes enable the manufacture of protective coatings having increased chemical and physical resistance and are expediently cured, thereby decreasing the manufacturing time of the security documents coated with a radiation curable protective varnish.

Free-radically UV radiation curable coatings, which are cured by free radical mechanisms consisting of the activation of one or more free radical photoinitiators able to liberate free radicals upon the action of radiation, in particular of UV light, which in turn initiate the polymerization of the radically curable monomers and/or oligomers so as to form a cured layer, suffer from insufficient adhesion properties, a limited physical resistance and undesirably high levels of shrinkage during curing. Cationic UV radiation curable coatings, which are cured by cationic mechanisms consisting of the activation by UV-Vis light of one or more cationic photoinitiators, which liberate cationic species, such as acids, which in turn initiate the polymerization of the cationically curable monomers so as to form a cured binder, exhibit increased adhesion and mechanical resistance when compared to free-radically UV radiation curable coatings. Hybrid UV radiation curable coatings i.e. coatings containing both cationically curable monomers and radically curable monomers and/or oligomers exhibit adhesion and mechanical resistance properties comparable to the ones of the cationic UV radiation curable coatings and additionally have the advantage of a higher curing speed compared to the cationic UV radiation curable coatings.

The use of a hybrid UV-Vis radiation curable protective varnish comprising cationically curable compounds, radically curable compounds, a cationic photoinitiator, a free radical photoinitiator and fluorinated compounds for imparting soil resistance to a security document has been disclosed by the international patent application publication number WO2014067715A1. The hybrid UV-Vis radiation curable protective varnish described therein is applied by screen printing or flexography printing and cured by exposure to UV light emitted by a standard mercury UV-lamp.

Mercury lamps require a high amount of energy, need efficient and costly heat dissipation systems, are prone to ozone formation and have a limited lifespan. With the aim of providing solutions that are less costly, require less intervention and are more environmentally friendly, lamps and systems based on UV-LEDs have been developed for curing inks and varnishes. Contrary to medium-pressure mercury lamps that have emission bands in the UV-A, UV-B and UV-C regions of the electromagnetic spectrum, UV-LED lamps emit radiation in the UV-A region. Moreover, current UV-LED lamps emit quasi monochromatic radiation, i.e. only emit at one wavelength, such as 365 nm, 385 nm, 395 nm or 405 nm.

UV-curing efficiency of a varnish or ink layer depends inter alia on the overlap of the emission spectrum of the irradiation source used for said curing and the absorption spectrum of the photoinitiator comprised in said varnish or ink. Accordingly, curing of hybrid UV radiation curable coating or ink layers comprising conventionally used cationic and free radical photoinitiators with UV-LED lamps suffers from a reduced curing efficiency as a result of the poor overlap of the emission spectrum of the UV-LED lamp with the absorption of the conventionally used photoinitiators, thus leading to slow or poor curing or curing defects.

Hybrid UV-LED radiation curable compositions have been described in the literature. Said hybrid UV-LED radiation curable compositions contain a free radical photoinitiator, a cationic photoinitiator and a photosensitizer, which absorbs the energy of the light emitted by the UV-LED lamp and acts as donor by transferring the energy to the cationic photoinitiator. Chinese patent application publication number CN107011768A discloses a hybrid high antifouling matte coating gloss oil curable by UV-LED exposure. The hybrid high antifouling matte coating gloss oil contains 60 wt-% cycloaliphatic epoxide, 18 wt-% oxetane, 5 wt-% aliphatic epoxy diacrylate, 3 wt-% 4,4'-dimethyldiphenyliodonium hexafluorophosphate, 0.5 wt-% 1-(biphenyl-4-yl)-2-methyl-2-morpholinylpropan-1-one, and 0.5 wt-% 1-chloro-4-propoxythioxanthone (CPTX). Because of the photoinitiation system used in the hybrid UV-LED-curable hybrid high antifouling matte coating gloss oil known in the art, and in particular the amount of CPTX sensitizer, required for achieving a good curing, the hybrid UV-LED radiation curable compositions known in the art exhibit high fluorescence upon excitation with UV light, in particular upon excitation with UV light having a wavelength of 254 nm or 366 nm.

It is well known that UV light excitable luminescent security features have been widely used in the field of security documents, in particular for banknotes, to confer said security documents additional covert security features, wherein the protection of said security documents against counterfeit and illegal reproduction relies upon the concept that such features typically require specialized equipment and knowledge for their detection. UV light excitable luminescent security features include for example UV light excitable luminescent fibers, UV light excitable luminescent threads, UV light excitable luminescent patches, stripes or foils (wherein at least a part of said patches, stripes or foils shows luminescence upon excitation with UV light) and printed UV light excitable luminescent features. Said printed UV light excitable luminescent features include luminescent numbering (printed by letterpress), printed patches (printed by letterset), as well as luminescent features printed by offset. As security documents generally contain UV light excitable luminescent security features, which are covered by a protective coating obtained from a protective varnish, the photoinitiation systems known in the art are not acceptable for being used in protective varnishes for security documents because upon excitation with UV light having a wavelength such as 254 nm or 366 nm, the high levels of fluorescence exhibited by the protective coating impair the machine detection and/or human recognition of the UV light excitable luminescent security features.

Thus, there remains a need for a hybrid UV-LED radiation curable protective varnish for providing at high speed (i.e. industrial speed) a protective coating for security documents, which extends their life and fitness for circulation, wherein said hybrid UV-LED radiation curable varnish exhibits optimal curing properties and, after being cured, low fluorescence in response to 254 nm excitation and 366 nm excitation that does not impair the machine detection and/or human recognition of luminescent security features excitable by UV light, in particular with UV light having a wavelength such as 254 nm or 366 nm, contained by the coated security documents.

SUMMARY OF THE INVENTION

Accordingly, it is the object of the present invention to provide a hybrid UV-LED radiation curable protective varnish for coating at high speed (i.e. industrial speed) security documents in order to extend their life and fitness for circulation, wherein said hybrid UV-LED radiation curable varnish exhibits optimal curing properties, and after being cured low fluorescence in response to excitation by UV light, such as 366 nm excitation and 254 nm excitation. This is achieved by the hybrid UV-LED radiation curable protective varnish claimed herein, wherein said protective varnish comprises:

a) from about 60 wt-% to about 85 wt-% of either a cycloaliphatic epoxide, or a mixture of a cycloaliphatic epoxide and one or more cationically curable monomers other than the cycloaliphatic epoxide;

b) from about 3 wt-% to about 15 wt-%, preferably from about 6 wt-% to about 10 wt-%, more preferably about 8 wt-% of one or more radically curable monomers and/or oligomers;

c) from about 1 wt-% to about 6 wt-%, preferably from about 2 wt-% to about 4 wt-%, more preferably about 2.5 wt-% of a diaryl iodonium salt;

d) from about 0.5 wt-% to about 3 wt-%, preferably from about 1 wt-% to about 2 wt-%, more preferably about 1.5 wt-% of a free radical photoinitiator selected from the group consisting of alpha-hydroxyketones, alpha-alkoxyketones, benzyl diketals, benzoin ethers, phosphine oxides, phenylglyoxylates, and mixtures thereof;

e) from about 0.01 wt-% to about 5 wt-% of a non-ionic surfactant; and f) a photosensitizer of general formula (I)

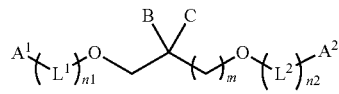

wherein in the general formula (I)
either
  i) $A^1$ and $A^2$ are independently of each other selected from hydrogen and a moiety of the following structure

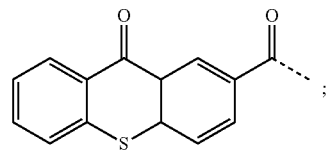

$-L^1-$ is selected from

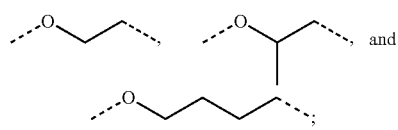

$-L^2-$ is selected from

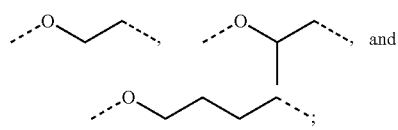

n1 and n2 are integers higher than or equal to 0;
and
either
  m represents 0;
  B represent hydrogen;
  C is selected from hydrogen,

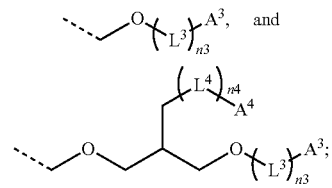

$A^3$ and $A^4$ are independently of each other selected from hydrogen and a moiety of the following structure:

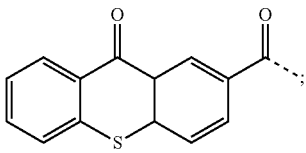

-$L^3$- and -$L^4$- are independently of each other selected from

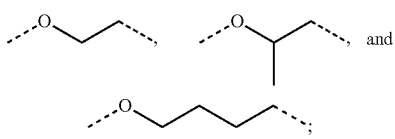

and n3, and n4 are integers higher than or equal to 0, wherein the sum n1+n2 is comprised between 2 and 8;
the sum n1+n2+n3 is comprised between 3 and 12; and
the sum n1+n2+n3+n4 is comprised between 4 and 16;

or m represents 1;
B is selected from ethyl, and

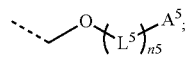

C is selected from

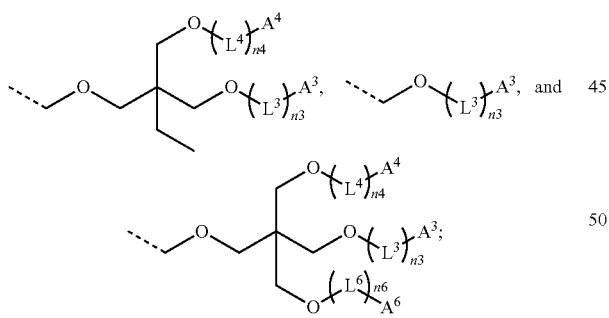

$A^3$, $A^4$, $A^5$ and $A^6$ are independently of each other selected from hydrogen and a moiety of the following structure:

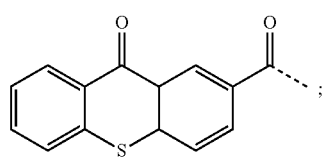

-$L^3$-, -$L^4$-, -$L^5$- and -$L^6$- are independently of each other selected from

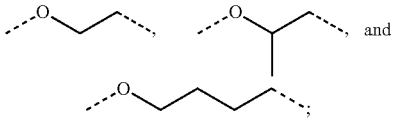

and n3, n4, n5 and n6 are integers higher than or equal to 0, wherein the sum n1+n2+n3 is comprised between 3 and 12;
the sum n1+n2+n3+n4 is comprised between 4 and 16;
the sum n1+n2+n3+n4+n6 is comprised between 5 and 15;
the sum n1+n2+n3+n5 is comprised between 4 and 16;
the sum n1+n2+n3+n4+n5 is comprised between 5 and 15;
the sum n1+n2+n3+n4+n5+n6 is comprised between 6 and 18;

wherein the UV-LED radiation curable protective varnish comprises a concentration of the moiety

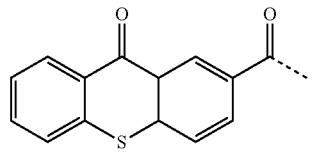

present in the photosensitizer of general formula (I) from about 1.3 mmol to about 3.2 mmol of said moiety per 100 g of hybrid UV-LED radiation curable protective varnish;

or ii) $A^1$ and $A^2$ are independently of each other selected from hydrogen and a moiety of the following structure

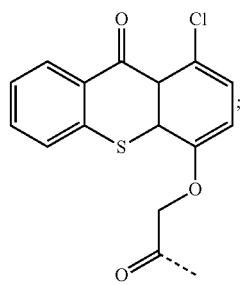

-$L^1$- is selected from

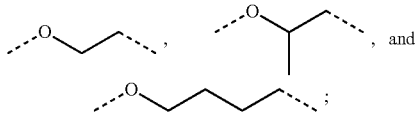

-$L^2$- is selected from

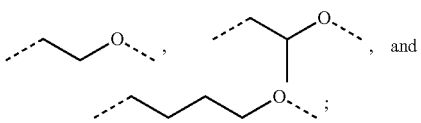

n1 and n2 are integers higher than or equal to 0;
and
either
  m represents 0;
  B represent hydrogen;
  C is selected from hydrogen,

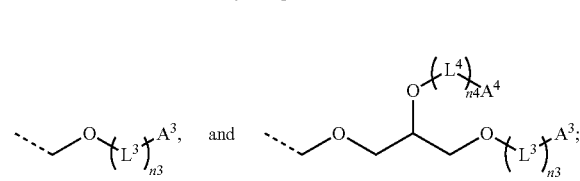

A³ and A⁴ are independently of each other selected from hydrogen and a moiety of the following structure:

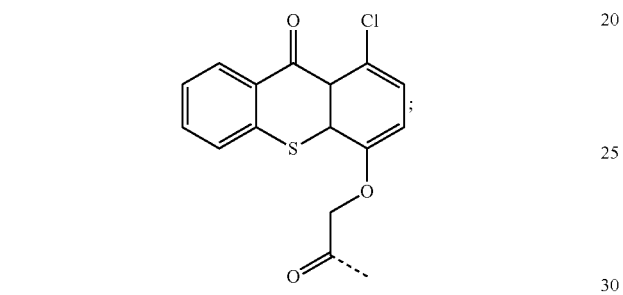

-L³- and -L⁴- are independently of each other selected from

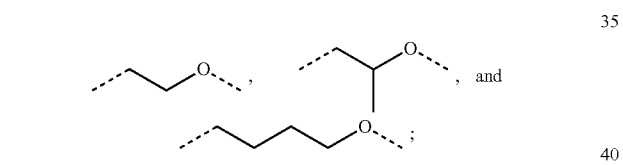

and n3, and n4 are integers higher than or equal to 0, wherein
  the sum n1+n2 is comprised between 2 and 8;
  the sum n1+n2+n3 is comprised between 3 and 12; and
  the sum n1+n2+n3+n4 is comprised between 4 and 16;
or
  m represents 1;
  B is selected from ethyl, and

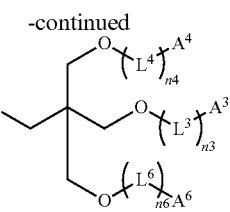

C is selected from

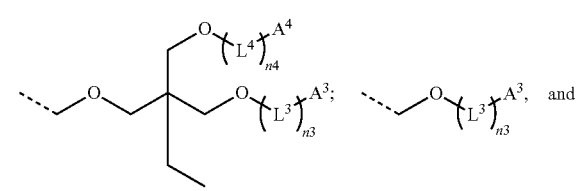

-continued

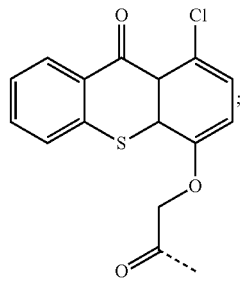

A³, A⁴, A⁵ and A⁶ are independently of each other selected from hydrogen and a moiety of the following structure:

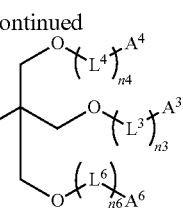

-L³-, -L⁴-, -L⁵- and -L⁶- are independently of each other selected from

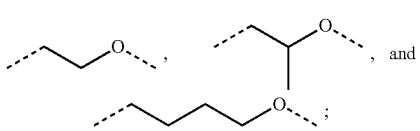

and n3, n4, n5 and n6 are integers higher than or equal to 0, wherein
  the sum n1+n2+n3 is comprised between 3 and 12;
  the sum n1+n2+n3+n4 is comprised between 4 and 16;
  the sum n1+n2+n3+n4+n6 is comprised between 5 and 15;
  the sum n1+n2+n3+n5 is comprised between 4 and 16;
  the sum n1+n2+n3+n4+n5 is comprised between 5 and 15;
  the sum n1+n2+n3+n4+n5+n6 is comprised between 6 and 18;
wherein the UV-LED radiation curable protective varnish comprises a concentration of the moiety

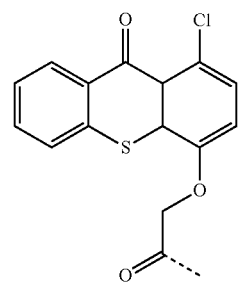

present in the photosensitizer of general formula (I) from about 1.3 mmol to about 2.6 mmol of said moiety per 100 g of hybrid UV-LED radiation curable protective varnish; wherein the weight percents are based on the total weight of the hybrid UV-LED radiation curable protective varnish.

Preferably, the photosensitizer contained by the hybrid UV-LED radiation curable protective varnish according to the present invention is a compound of general formula (I-b)

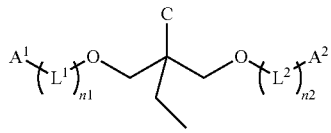

(I-b)

wherein $A^1$, $A^2$, C, n1, n2, $-L^1-$ and $-L^2-$ have the meanings defined herein, or a compound of general formula (I-c)

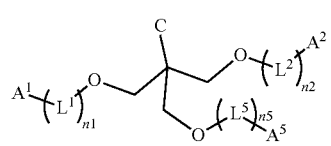

(I-c)

wherein $A^1$, $A^2$, $A^5$, C, n1, n2, n5, $-L^1-$, $-L^2-$ and $-L^5-$ have the meanings defined herein.

The hybrid UV-LED radiation curable protective varnish claimed and described herein is curable by exposure to UV light, preferably by exposure to one or more wavelengths of between about 365 nm and about 405 nm, more preferably by exposure to UV light at 365 nm and/or 385 nm and/or 395 nm, emitted by a UV-LED light source. Hence, another aspect according to the present invention is directed to a process for coating a security document comprising a substrate and one or more security features applied on or inserted into a portion of the substrate, wherein said process comprises the following steps:

i) applying, preferably by a printing method selected from flexography printing, inkjet printing, and screen printing, the hybrid UV-LED radiation curable protective varnish claimed and described herein on a surface of the substrate and/or a surface of the one or more security features of the security document so as to form a varnish layer; and ii) curing the varnish layer by exposure to UV light emitted by a UV-LED source so as to form a protective coating covering the surface of the substrate and/or the surface of the one or more security features of the security document. The coating process according to the present invention is environmentally friendly and enables the manufacture in an expedient manner (i.e. industrial speed) of dirt-repellent protective coatings for security documents that show acceptable levels of fluorescence in response to excitation by UV light, such as 366 nm excitation and 254 nm excitation.

A further aspect according to the present invention is directed to a security document comprising a substrate, one or more security features applied on or inserted into a portion of the substrate, and a protective coating covering a surface of the substrate and/or a surface of the one or more security features of the security document, wherein the protective coating is obtained by the coating process claimed and described herein.

DETAILED DESCRIPTION

Definitions

The following definitions are to be used to interpret the meaning of the terms discussed in the description and recited in the claims.

As used herein, the article "a/an" indicates one as well as more than one and does not necessarily limit its referent noun to the singular.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Preferably, the range denoted by the term "about" denotes a range within ±3% of the value, more preferably ±1%. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

The term "comprising" as used herein is intended to be non-exclusive and open-ended. Thus, for instance a solution comprising a compound A may include other compounds besides A. However, the term "comprising" also covers, as a particular embodiment thereof, the more restrictive meanings of "consisting essentially of" and "consisting of", so that for instance "a solution comprising A, B, and optionally C" may also (essentially) consist of A, and B, or (essentially) consist of A, B, and C.

Where the present description refers to "preferred" embodiments/features, combinations of these "preferred" embodiments/features are also deemed to be disclosed as long as the specific combination of "preferred" embodiments/features is technically meaningful.

As used herein, the term "one or more" means one, two, three, four, etc.

The terms "UV-LED radiation curable", "UV-LED radiation curing", "UV-LED curable" and "UV-LED curing" refer to radiation-curing by photo-polymerization under the influence of one or more radiations having a wavelength comprised between about 365 nm and about 405 nm, such as 365 nm and/or 385 nm and/or 395 nm emitted by one or more UV-LED sources.

As well known to a skilled person and used herein, a hybrid varnish refers to a varnish containing both cationically curable monomers, and radically curable monomers and/or oligomers.

The term "hybrid UV-LED radiation curable varnish" denotes a varnish containing cationically curable monomers, and radically curable monomers and/or oligomers, which is cured by cationic mechanisms and free radical mechanisms activated by one or more radiations having a wavelength comprised between about 365 nm and about 405 nm, such as 365 nm and/or 385 nm and/or 395 nm emitted by one or more UV-LED sources.

As used herein, a "2-keto-thioxanthone moiety" or a" 2-keto-9H-thioxanthen-9-one" refers to a moiety having the following structure:

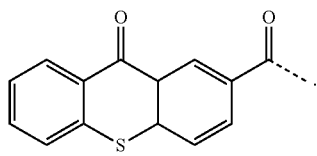

As used herein, a "1-chloro-4-carboxymethoxy-thioxanthone moiety" or a "1-chloro-4-carboxymethoxy-9H-thioxanthen-9-one" refers to a moiety having the following structure:

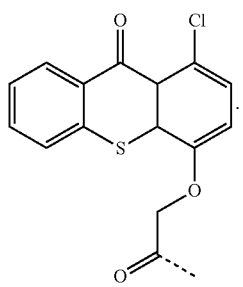

Surprisingly, it has been found that a hybrid UV-LED radiation curable protective varnish comprising:

a) from about 60 wt-% to about 85 wt-% of either a cycloaliphatic epoxide, or a mixture of a cycloaliphatic epoxide and one or more cationically curable monomers other than the cycloaliphatic epoxide;

b) from about 3 wt-% to about 15 wt-%, preferably from about 6 wt-% to about 10 wt-%, more preferably about 8 wt-% of one or more radically curable monomers and/or oligomers;

C) from about 1 wt-% to about 6 wt-%, preferably from about 2 wt-% to about 4 wt-%, more preferably about 2.5 wt-% of a diaryl iodonium salt;

d) from about 0.5 wt-% to about 3 wt-%, preferably from about 1 wt-% to about 2 wt-%, more preferably about 1.5 wt-% of a free radical photoinitiator selected from the group consisting of alpha-hydroxyketones, alpha-alkoxyketones, benzyl diketals, benzoin ethers, phosphine oxides, phenylglyoxylates, and mixtures thereof;

e) from about 0.01 wt-% to about 5 wt-% of a non-ionic surfactant; and f) a photosensitizer of general formula (I)

$$A^1 \{L^1\}_{n1} O \overset{B}{\underset{}{\phantom{X}}} \overset{C}{\underset{}{\phantom{X}}} (O)_m \{L^2\}_{n2} A^2 \quad (I)$$

wherein in the general formula (I)
either
i) $A^1$ and $A^2$ are independently of each other selected from hydrogen and a moiety of the following structure

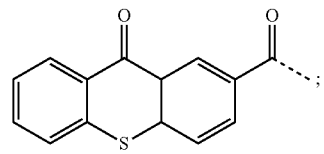

$-L^1-$ is selected from

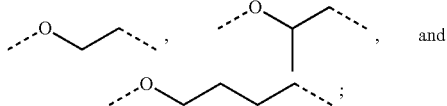

$-L^2-$ is selected from

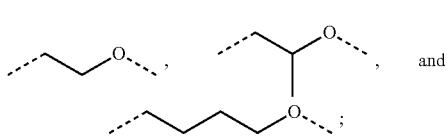

n1 and n2 are integers higher than or equal to 0;
and
either
m represents 0;
B represent hydrogen;
C is selected from hydrogen,

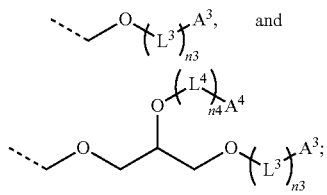

$A^3$ and $A^4$ are independently of each other selected from hydrogen and a moiety of the following structure:

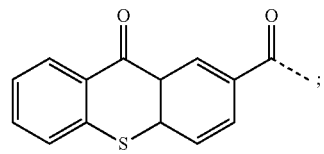

$-L^3-$ and $-L^4-$ are independently of each other selected from

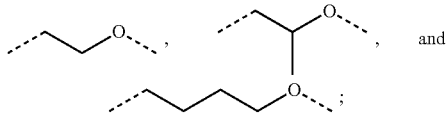

and n3, and n4 are integers higher than or equal to 0, wherein the sum n1+n2 is comprised between 2 and 8;
the sum n1+n2+n3 is comprised between 3 and 12; and
the sum n1+n2+n3+n4 is comprised between 4 and 16;

or m represents 1;
B is selected from ethyl, and

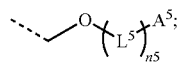

C is selected from

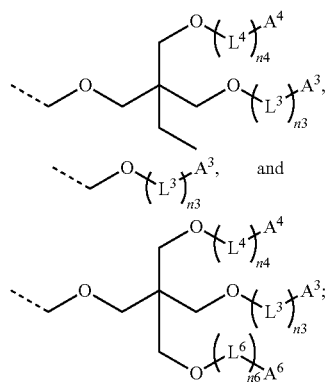

$A^3$, $A^4$, $A^5$ and $A^6$ are independently of each other selected from hydrogen and a moiety of the following structure:

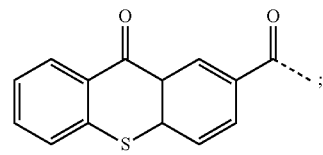

$-L^3-$, $-L^4-$, $-L^5-$ and $-L^6-$ are independently of each other selected from

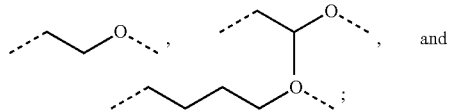

and n3, n4, n5 and n6 are integers higher than or equal to 0, wherein the sum n1+n2+n3 is comprised between 3 and 12;
the sum n1+n2+n3+n4 is comprised between 4 and 16;
the sum n1+n2+n3+n4+n6 is comprised between 5 and 15;
the sum n1+n2+n3+n5 is comprised between 4 and 16;
the sum n1+n2+n3+n4+n5 is comprised between 5 and 15;
the sum n1+n2+n3+n4+n5+n6 is comprised between 6 and 18;

wherein the UV-LED radiation curable protective varnish comprises a concentration of the moiety

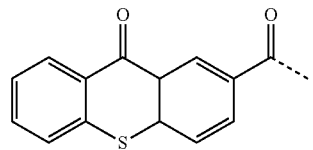

present in the photosensitizer of general formula (I) from about 1.3 mmol to about 3.2 mmol of said moiety per 100 g of hybrid UV-LED radiation curable protective varnish;

or ii) $A^1$ and $A^2$ are independently of each other selected from hydrogen and a moiety of the following structure

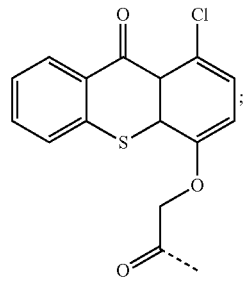

$-L^1-$ is selected from

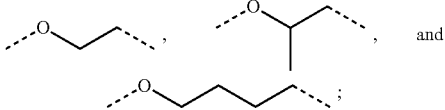

$-L^2-$ is selected from

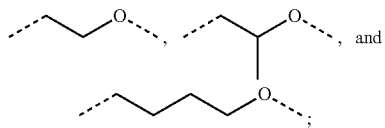

n1 and n2 are integers higher than or equal to 0;

and either m represents 0;
B represent hydrogen;
C is selected from hydrogen,

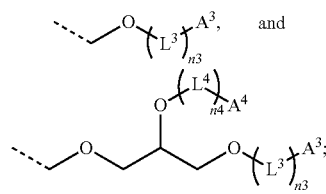

$A^3$ and $A^4$ are independently of each other selected from hydrogen and a moiety of the following structure:

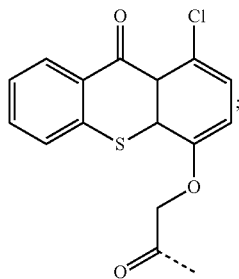

-$L^3$- and -$L^4$- are independently of each other selected from

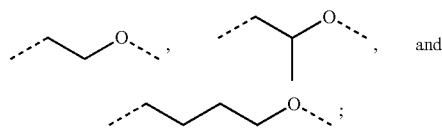

and n3, and n4 are integers higher than or equal to 0, wherein the sum n1+n2 is comprised between 2 and 8;

the sum n1+n2+n3 is comprised between 3 and 12; and the sum n1+n2+n3+n4 is comprised between 4 and 16;

or m represents 1;

B is selected from ethyl, and

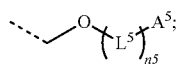

C is selected from

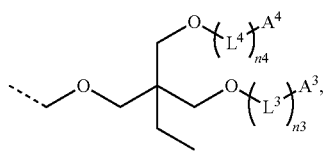

and

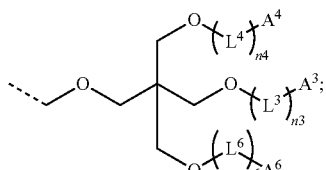

$A^3$, $A^4$, $A^5$ and $A^6$ are independently of each other selected from hydrogen and a moiety of the following structure:

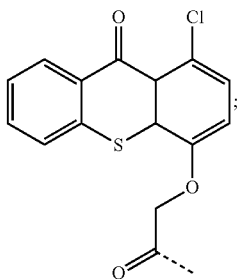

$L^3$-, -$L^4$-, -$L^5$- and -$L^6$- are independently of each other selected from

and n3, n4, n5 and n6 are integers higher than or equal to 0, wherein the sum n1+n2+n3 is comprised between 3 and 12;

the sum n1+n2+n3+n4 is comprised between 4 and 16;

the sum n1+n2+n3+n4+n6 is comprised between 5 and 15;

the sum n1+n2+n3+n5 is comprised between 4 and 16;

the sum n1+n2+n3+n4+n5 is comprised between 5 and 15;

the sum n1+n2+n3+n4+n5+n6 is comprised between 6 and 18;

wherein the UV-LED radiation curable protective varnish comprises a concentration of the moiety

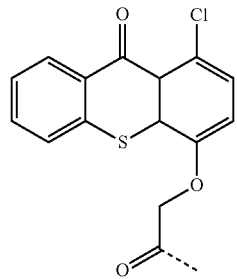

present in the photosensitizer of general formula (I) from about 1.3 mmol to about 2.6 mmol of said moiety per 100 g of hybrid UV-LED radiation curable protective varnish; wherein the weight percents are based on the total weight of the hybrid UV-LED radiation curable protective varnish, exhibits optimal curing properties, and following curing, shows levels of fluorescence in response to excitation by UV light, such as 366 nm excitation and 254 nm excitation, that are acceptable in the field of security documents.

The use of a photoinitiation system containing a free radical photoinitiator selected from the group consisting of alpha-hydroxyketones, alpha-alkoxyketones, benzyl diketals, benzoin ethers, phosphine oxides, phenylglyoxylates, and mixtures thereof, a diaryl iodonium salt as a cationic photoinitiator and a photosensitizer of general formula (I) containing either i) one or more 2-keto-thioxanthone moieties, wherein the concentration of 2-keto-thioxanthone moiety present in (i.e. contained by) the photosensitizer of general formula (I) in the hybrid UV-LED curable protective varnish is of between about 1.3 mmol and about 3.2 mmol, preferably of between about 1.45 mmol and about 3.10 mmol, more preferably of between about 1.65 mmol to about 2.96 mmol, of said 2-keto-thioxanthone moiety per 100 g of hybrid UV-LED curable protective varnish, or, ii) one or more 1-chloro-4-carboxymethoxy-thioxanthone moieties, wherein the concentration of the 1-chloro-4-carboxymethoxy-thioxanthone moiety present in (i.e. contained by) the photosensitizer of general formula (I) is from about 1.3 mmol to about 2.6 mmol, preferably from about 1.45 mmol to about 2.45 mmol, more preferably from about 1.66 mmol to about 2.31 mmol, of said moiety per 100 g of hybrid UV-LED radiation curable protective varnish, ensures that the hybrid UV-LED curable protective varnish exhibits optimal curing properties and provides protective coatings with levels of fluorescence in response to excitation by UV light, such as 366 nm excitation and 254 nm excitation, acceptable for the field of security documents.

The hybrid UV-LED radiation curable protective varnish claimed and described herein comprises f) a photosensitizer of general formula (I)

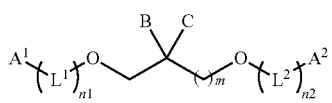

(I)

wherein in the general formula (I)
either
i) $A^1$ and $A^2$ are independently of each other selected from hydrogen and a moiety of the following structure

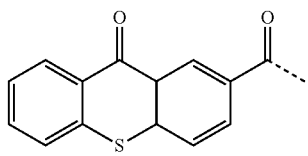

(i.e. a 2-keto-thioxanthone moiety);
-$L^1$- is selected from

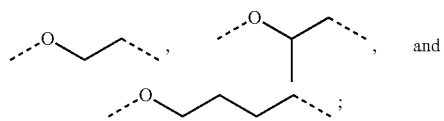

-$L^2$- is selected from

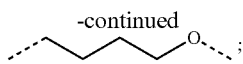

$n1$ and $n2$ are integers higher than or equal to 0;
and
either
 m represents 0;
 B represent hydrogen;
 C is selected from hydrogen,

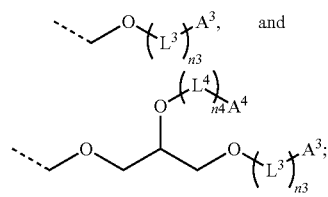

$A^3$ and $A^4$ are independently of each other selected from hydrogen and a moiety of the following structure:

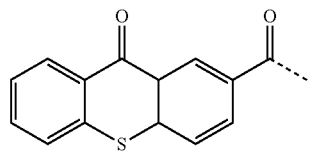

(i.e. a 2-keto-thioxanthone moiety);
-$L^3$- and -$L^4$- are independently of each other selected from

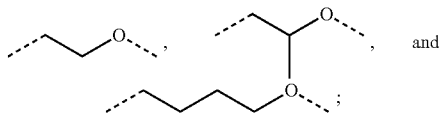

and $n3$, and $n4$ are integers higher than or equal to 0, wherein
the sum $n1+n2$ is comprised between 2 and 8;
the sum $n1+n2+n3$ is comprised between 3 and 12; and
the sum $n1+n2+n3+n4$ is comprised between 4 and 16;
or
 m represents 1;
 B is selected from ethyl, and

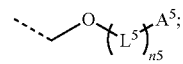

C is selected from

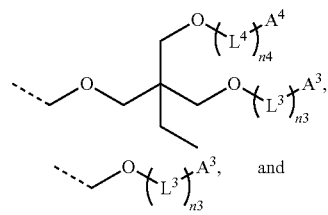

-continued

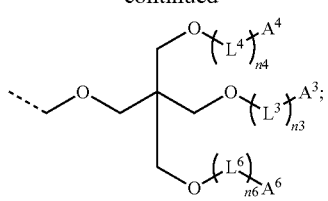

$A^3$, $A^4$, $A^5$ and $A^6$ are independently of each other selected from hydrogen and a moiety of the following structure:

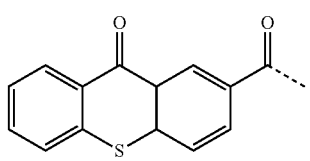

(i.e. a 2-keto-thioxanthone moiety);

-$L^3$-, -$L^4$-, -$L^5$- and -$L^6$- are independently of each other selected from

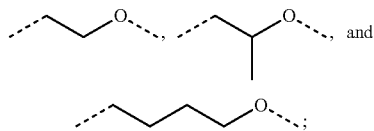

and n3, n4, n5 and n6 are integers higher than or equal to 0, wherein the sum n1+n2+n3 is comprised between 3 and 12;

the sum n1+n2+n3+n4 is comprised between 4 and 16;

the sum n1+n2+n3+n4+n6 is comprised between 5 and 15;

the sum n1+n2+n3+n5 is comprised between 4 and 16;

the sum n1+n2+n3+n4+n5 is comprised between 5 and 15;

the sum n1+n2+n3+n4+n5+n6 is comprised between 6 and 18;

wherein the UV-LED radiation curable protective varnish comprises a concentration of the 2-keto-thioxanthone moiety

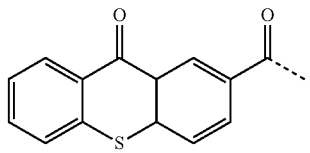

present in the photosensitizer of general formula (I) from about 1.3 mmol to about 3.2 mmol, preferably from about 1.45 mmol to about 3.10 mmol, more preferably from about 1.65 mmol to about 2.96 mmol, of said moiety per 100 g of hybrid UV-LED radiation curable protective varnish;

or ii) $A^1$ and $A^2$ are independently of each other selected from hydrogen and a moiety of the following structure

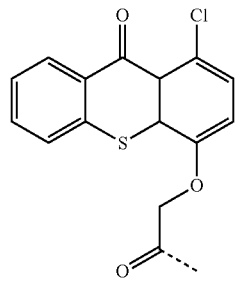

(i.e. a 1-chloro-4-carboxymethoxy-thioxanthone moiety);

-$L^1$- is selected from

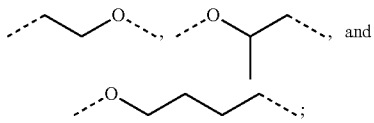

-$L^2$- is selected from

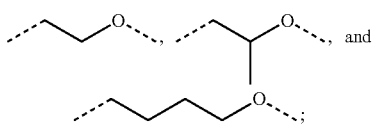

n1 and n2 are integers higher than or equal to 0; and
either
m represents 0;
B represent hydrogen;
C is selected from hydrogen,

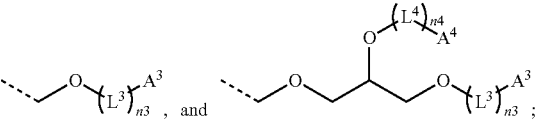

$A^3$ and $A^4$ are independently of each other selected from hydrogen and a moiety of the following structure:

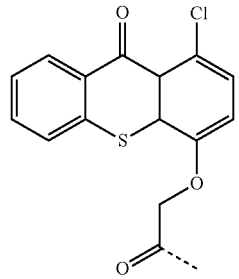

(i.e. a 1-chloro-4-carboxymethoxy-thioxanthone moiety);

-L³- and -L⁴- are independently of each other selected from

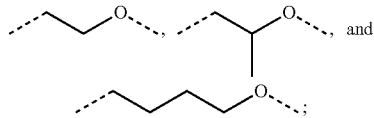

and n3, and n4 are integers higher than or equal to 0, wherein
the sum n1+n2 is comprised between 2 and 8;
the sum n1+n2+n3 is comprised between 3 and 12; and
the sum n1+n2+n3+n4 is comprised between 4 and 16;

or m represents 1;
B is selected from ethyl, and

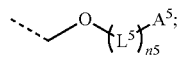

C is selected from

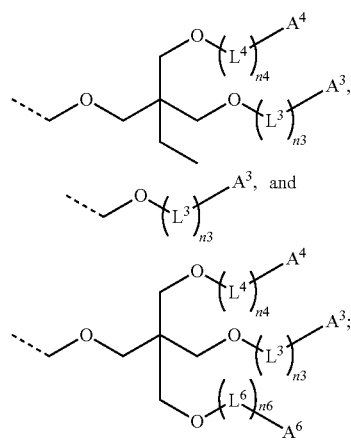

A³, A⁴, A⁵ and A⁶ are independently of each other selected from hydrogen and a moiety of the following structure:

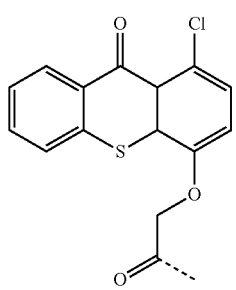

(i.e. a 1-chloro-4-carboxymethoxy-thioxanthone moiety);

-L³-, -L⁴-, -L⁵- and -L⁶- are independently of each other selected from

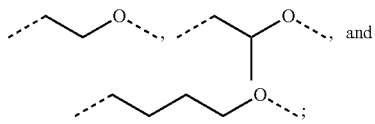

and n3, n4, n5 and n6 are integers higher than or equal to 0, wherein
the sum n1+n2+n3 is comprised between 3 and 12;
the sum n1+n2+n3+n4 is comprised between 4 and 16;
the sum n1+n2+n3+n4+n6 is comprised between 5 and 15;
the sum n1+n2+n3+n5 is comprised between 4 and 16;
the sum n1+n2+n3+n4+n5 is comprised between 5 and 15;
the sum n1+n2+n3+n4+n5+n6 is comprised between 6 and 18;

wherein the UV-LED radiation curable protective varnish comprises a concentration of the 1-chloro-4-carboxymethoxy-thioxanthone moiety

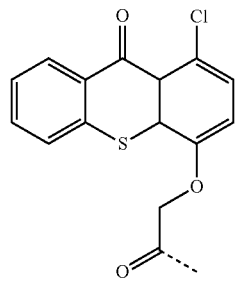

present in the photosensitizer of general formula (I) from about 1.3 mmol to about 2.6 mmol, preferably from about 1.45 mmol to about 2.45 mmol, more preferably from about 1.66 mmol to about 2.31 mmol, of said moiety per 100 g of hybrid UV-LED radiation curable protective varnish; wherein the weight percents are based on the total weight of the hybrid UV-LED radiation curable protective varnish.

As the hybrid UV-LED radiation curable protective varnish comprises either i) a concentration of the 2-keto-thioxanthone moiety present in the photosensitizer from about 1.3 mmol to about 3.2 mmol, preferably from about 1.45 mmol to about 3.10 mmol, more preferably from about 1.65 mmol to about 2.96 mmol, of said moiety per 100 g of hybrid UV-LED radiation curable protective varnish, or ii) a concentration of the 1-chloro-4-carboxymethoxy-thioxanthone moiety present in the photosensitizer from about 1.3 mmol to about 2.6 mmol, preferably from about 1.45 mmol to about 2.45 mmol, more preferably from about 1.66 mmol to about 2.31 mmol, of said moiety per 100 g of hybrid UV-LED radiation curable protective varnish, the corresponding amount (wt-% based on the total weight of the hybrid UV-LED radiation curable protective varnish) of photosensitizer of general formula (I) contained by said varnish can be easily calculated on the basis of the molar concentration of the 2-keto-thioxanthone moiety in a photosensitizer of general formula (I) (mmol 2-keto-thioxanthone moiety/g of photosensitizer of general formula (I)), or on the basis of the molar concentration of the 1-chloro-4-carboxymethoxy-thioxanthone moiety in a photosensitizer of general formula (I) (mmol 1-chloro-4-carboxymethoxy-thioxanthone moiety/g of photosensitizer of general formula (I)). The molar concentration of the 2-keto-thioxanthone moiety in a photosensitizer of general formula (I) (mmol 2-keto-thioxanthone moiety/g of photosensitizer), as well as the molar concentration of the 1-chloro-4-carboxymethoxy-thioxanthone moiety in a photosensitizer of general formula (I) (mmol 1-chloro-4-carboxymethoxy-thioxanthone moiety/g of photosensitizer of general formula (I)) is equal to the sulfur molar concentration in said photosensitizer of general formula (I) (mmol sulfur/g of photosensitizer), which can be determined by Energy Dispersion X-Ray Fluorescence (ED-XRF) using the signal of the sulfur atom contained by the 2-keto-thioxanthone moiety and the 1-chloro-4-carboxymethoxy-thioxanthone moiety, respectively. The ED-XRF measurement may be conducted by the internal standard addition technique with a spectrometer Spectro XEFOS by using a 9H-thioxanthen-9-one (thioxanthone) containing compound of a known structure, for example 2-isopropyl-9H-thioxanthen-9-one (ITX), as an internal standard.

In a preferred embodiment according to the present invention, m represents 0 and B represents hydrogen. Thus, a hybrid UV-LED curable protective varnish containing a photosensitizer of general formula (I-a)

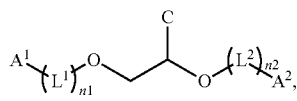

(I-a)

wherein $A^1$, $A^2$, C, n1, n2, $-L^1-$ and $-L^2-$ have the meanings defined herein, is preferred.

In an alternative preferred embodiment according to the present invention, m represents 1. Hence, the hybrid UV-LED radiation curable protective varnish claimed and described herein may contain a photosensitizer f general formula (I-d)

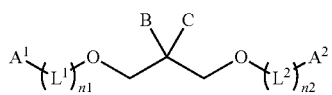

(I-d)

wherein $A^1$, $A^2$, B, C, $-L^1-$, $-L^2-$, n1 and n2 have the meanings defined herein.

An especially preferred embodiment according to the present invention relates to a hybrid UV-LED radiation curable protective varnish as claimed and described herein, wherein m represents 1 and B represents ethyl. Hence, a hybrid UV-LED radiation curable protective varnish as claimed and described herein containing a photosensitizer of general formula (I-b)

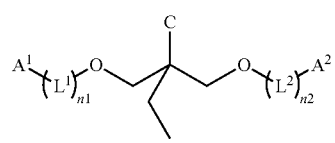

(I-b)

wherein $A^1$, $A^2$, C, n1, n2, $-L^1-$ and $-L^2-$ have the meanings defined herein, is especially preferred.

A further preferred embodiment according to the present invention relates to a hybrid UV-LED radiation curable protective varnish as claimed and described herein, wherein m represents 1 and B represents

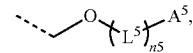

wherein $-L^5-$, n5 and $A^5$ have the meanings defined herein. Hence, a hybrid UV-LED radiation curable protective varnish as claimed and described herein containing a photosensitizer of general formula (I-c)

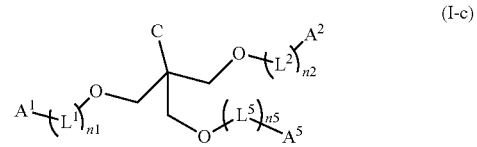

(I-c)

wherein $A^1$, $A^2$, $A^5$, C, n1, n2, n5, $-L^1-$, $-L^2-$ and $-L^5-$ have the meanings defined herein, is also preferred.

Preferably, C represents

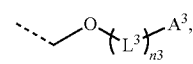

wherein $-L^3-$, n3 and $A^3$ have the meanings defined herein. Thus, a hybrid UV-LED radiation curable protective varnish as claimed and described herein containing a photosensitizer of general formula (I), (I-a), (I-b), (I-c) or (I-d), wherein C represents

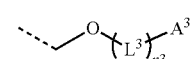

and $-L^3-$, n3 and $A^3$ have the meanings defined herein, is preferred.

Especially preferred is a hybrid UV-LED radiation curable protective varnish as claimed and described herein containing a photosensitizer of general formula (I-e)

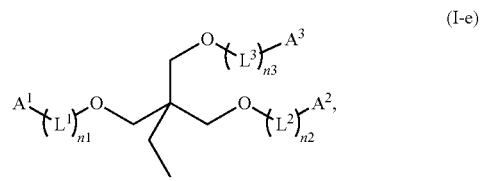

(I-e)

wherein $A^1$, $A^2$, $A^3$, $-L^1-$, $-L^2-$, $-L^3-$, n1, n2 and n3 have the meanings defined herein.

Preferably $-L^1-$ represents

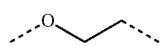

and -$L^2$-, -$L^3$-, -$L^4$-, -$L^5$- and -$L^6$- represent

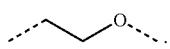

Thus, a hybrid UV-LED curable protective varnish comprising a photosensitizer of general formula (I), (I-a), (I-b), (I-c), (I-d) or (I-e), wherein -$L^1$- represents

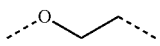

and -$L^2$-, -$L^3$-, -$L^4$-, -$L^5$- and -$L^6$- represent

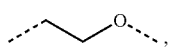

is preferred.

A particularly preferred embodiment according to the present invention is directed to a hybrid UV-LED curable protective varnish comprising a photosensitizer of general formula (I-f)

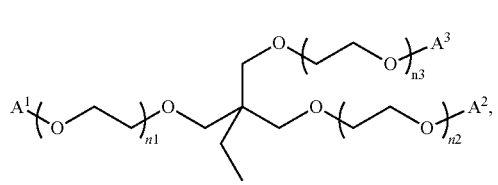

(I-f)

wherein $A^1$, $A^2$, $A^3$, n1, n2 and n3 have the meanings defined herein. In the general formula (I-f), one or more, preferably two or more of the $A^1$, $A^2$, and $A^3$ represent a 2-keto-thioxanthone moiety of the following structure:

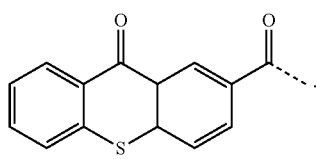

A particularly preferred hybrid UV-LED curable protective varnish according to the present invention comprises a photosensitizer of general formula (I-f), wherein $A^1$, $A^2$, and $A^3$ are 2-keto-thioxanthone moieties, and/or a photosensitizer of general formula (I-f), wherein $A^1$ and $A^2$ are 2-keto-thioxanthone moieties, and $A^3$ represents hydrogen, and/or a photosensitizer of general formula (I-f), wherein $A^1$ is a 2-keto-thioxanthone moiety and $A^2$ and $A^3$ represent hydrogen, and is characterized by a concentration of the 2-keto-thioxanthone moiety from about 1.3 mmol to about 3.2 mmol, preferably from about 1.45 mmol to about 3.10 mmol, more preferably from about 1.65 mmol to about 2.96 mmol, of said moiety per 100 g of hybrid UV-LED radiation curable protective varnish.

Also especially preferred is a hybrid UV-LED radiation curable protective varnish as claimed and described herein containing a photosensitizer of general formula (I-g)

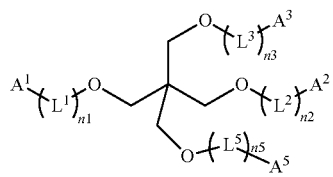

(I-g)

wherein $A^1$, $A^2$, $A^3$, $A^5$, -$L^1$-, -$L^2$-, -$L^3$-, -$L^5$-, n1, n2, n3 and n5 have the meanings defined herein. In a further preferred embodiment according to the present invention, -$L^1$- represents

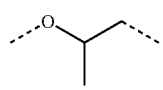

and -$L^2$-, -$L^3$-, -$L^4$-, -$L^5$- and -$L^6$- represent

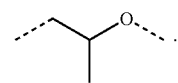

Thus, a hybrid UV-LED curable protective varnish comprising a photosensitizer of general formula (I), (I-a), (I-b), (I-c), (I-d), (I-e) or (I-g), wherein -$L^1$- represents

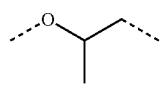

and -$L^2$-, -$L^3$-, -$L^4$-, -$L^5$- and -$L^6$- represent

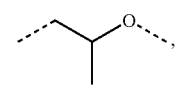

is also preferred.

An especially preferred embodiment according to the present invention is directed to a hybrid UV-LED curable protective varnish comprising a photosensitizer of general formula (I-h)

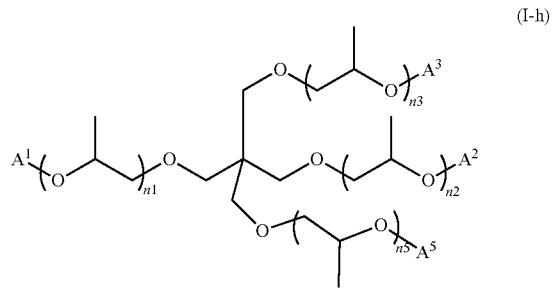

(I-h)

wherein $A^1$, $A^2$, $A^3$, $A^5$, n1, n2, n3 and n5 have the meanings defined herein. In the general formula (I-h), one or more, preferably two or more of the $A^1$, $A^2$, $A^3$ and $A^5$ represent a 1-chloro-4-carboxymethoxy-thioxanthone moiety of the following structure:

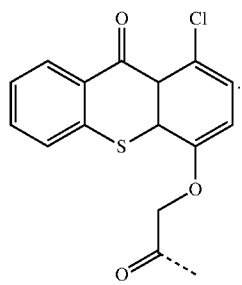

A particularly preferred hybrid UV-LED curable protective varnish according to the present invention comprises a photosensitizer of general formula (I-h), wherein $A^1$, $A^2$, $A^3$ and $A^5$ are 1-chloro-4-carboxymethoxy-thioxanthone moieties, and/or a photosensitizer of general formula (I-h), wherein $A^1$, $A^2$ and $A^3$ are 1-chloro-4-carboxymethoxy-thioxanthone moieties, and $A^5$ represents hydrogen, and/or a photosensitizer of general formula (I-h), wherein $A^1$ and $A^2$ are 1-chloro-4-carboxymethoxy-thioxanthone moieties, and $A^3$ and $A^5$ represents hydrogen, and/or a photosensitizer of general formula (I-h), wherein $A^1$ is a 1-chloro-4-carboxymethoxy-thioxanthone moiety, and $A^2$, $A^3$ and $A^5$ represent hydrogen, and is characterized by a concentration of the 1-chloro-4-carboxymethoxy-thioxanthone moiety from about 1.3 mmol to about 2.6 mmol, preferably from about 1.45 mmol to about 2.45 mmol, more preferably from about 1.66 mmol to about 2.31 mmol, of said moiety per 100 g of hybrid UV-LED radiation curable protective varnish.

The hybrid UV-LED curable protective varnish may comprise a mixture of photosensitizers of general formula (I), (I-a), (I-b), (I-c), (I-d), (I-e), (I-f) or (I-h), with the proviso that the varnish contains either
  i) a concentration of the 2-keto-thioxanthone moiety from about 1.3 mmol to about 3.2 mmol, preferably from about 1.45 mmol to about 3.10 mmol, more preferably from about 1.66 mmol to about 2.96 mmol, of said moiety per 100 g of hybrid UV-LED radiation curable protective varnish, or
  ii) a concentration of the 1-chloro-4-carboxymethoxy-thioxanthone moiety from about 1.3 mmol to about 2.6 mmol, preferably from about 1.45 mmol to about 2.45 mmol, more preferably from about 1.66 mmol to about 2.31 mmol of said moiety per 100 g of hybrid UV-LED radiation curable protective varnish.

The photosensitizer of general formula (I), (I-a), (I-b), (I-c), (I-d), (I-e), (I-f), (I-h) and (I-g) preferably has a weight average molecular weight ($M_w$) higher than or equal to about 700 g/mol eq PS, more preferably higher than or equal to 900 g/mol eq PS, wherein said weight average molecular weight is determined by gel permeation chromatography (GPC) according to the OECD (Organisation for Economic Cooperation and Development) test method 118, wherein a Malvern Viskotek GPCmax is used and wherein a calibration curve (log(molecular mass)=f(retention volume)) is established using six polystyrene (PS) standards (with molecular masses ranging from 472 to 512000 g/mol). The device is equipped with an isocratic pump, a degasser, an autosampler and a triple detector TDA 302 comprising a differential refractometer, a viscosimeter and a double-angle light scattering detector (7° and 90°). For this specific measurement, only the differential refractometer is used. Two columns Viskotek TM4008L (column length 30.0 cm, internal diameter 8.0 mm) were coupled in series. The stationary phase was made of a styrene-divinylbenzene copolymer with a particle size of 6 µm and a maximum pore size of 3000 Å. During the measurements, the temperature was fixed at 35° C. and the samples contain 10 mg/mL of the compound to be analyzed and being dissolved in THF (Acros, 99.9%, anhydrous). As described in the Examples herebelow, the samples are independently injected at a rate of 1 ml/min. The molecular mass of the compound is calculated from the chromatogram as a polystyrene-equivalent weight average molecular weight (PS eq $M_w$), with a 95% confidence level and the average of three measurements of the same solution, using the following formula:

$$M_w = \frac{\sum_{i=1}^{n} H_i M_i}{\sum_{i=1}^{n} H_i}$$

where $H_i$ is the level of the detector signal from the baseline for the retention volume $V_i$, $M_i$ is the molecular weight of the polymer fraction at the retention volume $V_i$ and n is number of data points. Omnisec 5.12 as supplied with the device is used as a software.

The hybrid UV-LED curable protective varnish claimed and described herein comprises
  c) from about 1 wt-% to about 6 wt-%, preferably from about 2 wt-% to about 4 wt-%, more preferably about 2.5 wt-% of a diaryl iodonium salt.

As used herein, the term "diaryl iodonium salt" refers to a cationic photoinitiator containing a diaryl iodonium as cationic moiety and any suitable anionic moiety including, but not limited to $BF_4^-$ (tetrafluoroborate, CAS Nr 14874-70-5), $B(C_6F_5)_4^-$ (tetrakis(pentafluorophenyl)borate, CAS Nr 47855-94-7), $PF_6^-$ (hexafluorophosphate, CAS Nr 16919-18-9), $AsF_6^-$ (hexafluoroarsenate, CAS Nr 16973-45-8), $SbF_6^-$ (hexafluoroantimonate, CAS Nr 17111-95-4), $CF_3SO_3^-$ (trifluoromethanesulfonate, CAS Nr 37181-39-8), $(CH_3C_6H_4)SO_3$ (4-methylbenzenesulfonate, CAS Nr 16722-51-3), $(C_4F_9)SO_3^-$ (1,1,2,2,3,3,4,4,4-nonafluoro-1-butanesulfonate, CAS Nr 45187-15-3), $(CF_3)CO_2^-$ (trifluoroacetate, CAS Nr 14477-72-6), $(C_4F_9)CO_2^-$ (2,2,3,3,4,4,5,5,5-nonafluoro-1-pentanoate, CAS Nr 45167-47-3), and $(CF_3SO_2)_3C^-$ (tris(trifluoromethylsulfonyl)methide, CAS Nr 130447-45-9).

The two aryl groups of the diaryl iodonium cationic moiety may be independently of each other substituted by one or more linear or branched alkyl groups (such as for example methyl, ethyl, isopropyl, isobutyl, tertbutyl, undecyl, dodecyl, tridecyl, tetradecyl etc.) that are optionally substituted by one or more halogens and/or one or more hydroxy groups; one or more alkyloxy groups that are optionally substituted by one or more halogens and/or one or more hydroxy groups; one or more nitro groups; one or more halogens; one or more hydroxy groups; or a combination thereof. Examples of diaryl iodonium cationic moiety as described herein include bis(4-dodecylphenyl)iodonium (CAS Nr 71786-69-1), bis[4-(1,1-dimethylethyl) phenyl] iodonium (CAS Nr 61267-44-5), (4-isopropylphenyl)(4-methylphenyl)iodonium (CAS Nr 178233-71-1), bis(4-methylphenyl)iodonium (CAS Nr 46449-56-3), (4-methylphenyl)[4-(2-methylpropyl)phenyl]iodonium (CAS Nr 344562-79-4), bis(2,4-dimethylphenyl)]iodonium (CAS Nr 78337-07-2), bis(3,4-dimethylphenyl)]iodonium (CAS Nr 66482-57-3), (4-methylphenyl)(2,4,6-trimethylphenyl)iodonium (CAS Nr 758629-51-5), bis[(4-(2-methylpropyl)phenyl]iodonium (CAS Nr 157552-66-4), bis(4-butylphenyl]iodonium (CAS Nr 76310-29-7), bis(2,4,6-trimethylphenyl)iodonium (CAS Nr 94564-97-3), bis(4-hexylphenyl)iodonium (CAS Nr 249300-48-9), bis(4-decylphenyl)iodonium (CAS Nr 137141-44-7), (4-decylphenyl)(4-undecylphenyl)iodonium (CAS Nr 167997-83-3), bis(4-undecylphenyl)iodonium (CAS Nr 167997-61-7), bis(4-tridecylphenyl)iodonium (CAS Nr 124053-08-3), bis(4-tetradecylphenyl)iodonium (CAS Nr 167997-63-9), bis(4-hexadecylphenyl)iodonium (CAS Nr 137141-41-4), bis(4-heptadecylphenyl)iodonium (CAS Nr 144095-91-0), bis(4-octadecylphenyl)iodonium (CAS Nr 202068-75-5), (4-decylphenyl)(4-dodecylphenyl)iodonium (CAS Nr 167997-67-3), (4-decylphenyl)(4-tridecylphenyl)iodonium (CAS Nr 167997-77-5), (4-decylphenyl)(4-tetradecylphenyl)iodonium (CAS Nr 167997-81-1), (4-dodecylphenyl)(4-undecylphenyl)iodonium (CAS Nr 167997-71-9), (4-dodecylphenyl)(4-tridecylphenyl)iodonium (CAS Nr 167997-69-5), (4-dodecylphenyl)(4-tetradecylphenyl) iodonium (CAS Nr 167997-65-1), (4-tridecylphenyl)(4-undecylphenyl)iodonium (CAS Nr 167997-73-1), (4-tetradecylphenyl)(4-undecylphenyl) iodonium (CAS Nr 167997-79-7), (4-tetradecylphenyl)(4-tridecylphenyl)iodonium (CAS Nr 167997-75-3), p-(octyloxyphenyl) phenyliodonium (CAS Nr 121239-74-5), [4-[(2-hydroxytetradecyl)oxy]phenyl]phenyliodonium (CAS Nr 139301-14-7), phenyl[3-(trifluoromethyl)phenyl]iodonium (CAS Nr 789443-26-1), bis(4-fluorophenyl)iodonium (CAS Nr 91290-88-9), (4-nitrophenyl)phenyliodonium (CAS Nr 46734-23-0), and (4-nitrophenyl)(2,4,6-trimethylphenyl)iodonium (CAS Nr 1146127-10-7).

Preferably, the diaryl iodonium salt is of a compound of general formula (II)

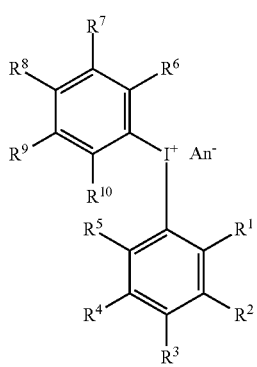

(II)

wherein
$R^1$-$R^{10}$ are independently of each other selected from hydrogen, a $C_1$-$C_{18}$-alkyl group, and $C_1$-$C_{12}$-alkyloxy group; and
$An^-$ is an anion selected from $BF_4^-$, $B(C_6F_5)_4^-$, $PF_6^-$, $AsF_6^-$, $SbF_6^-$, $CF_3SO_3^-$, $(CH_3C_6H_4)SO_3^-$, $(C_4F_9)SO_3^-$, $(CF_3)CO_2^-$, $(C_4F_9)CO_2^-$, and $(CF_3SO_2)_3C^-$, preferably selected from $BF_4^-$, $B(C_6F_5)_4^-$, $PF_6^-$, $AsF_6^-$, $SbF_6^-$, and $CF_3SO_3^-$.

The term "$C_1$-$C_{18}$-alkyl group" as used herein refers to a saturated linear and branched-chain monovalent hydrocarbon radical of one to eighteen carbon atoms ($C_1$-$C_{18}$). Examples of $C_1$-$C_{18}$-alkyl groups include, but are not limited to methyl (Me, —$CH_3$), ethyl (Et, —$CH_2CH_3$), 1-propyl (n-Pr, n-propyl, —$CH_2CH_2CH_3$), 2-propyl (i-Pr, iso-propyl, —$CH(CH_3)_2$), 1-butyl (n-Bu, n-butyl, —$CH_2CH_2CH_2CH_3$), 2-methyl-1-propyl (i-Bu, i-butyl, —$CH_2CH(CH_3)_2$), 2-butyl (s-Bu, s-butyl, —$CH(CH_3)CH_2CH_3$), 2-methyl-2-propyl (t-Bu, t-butyl, —$C(CH_3)_3$), 1-pentyl (n-pentyl, —$CH_2CH_2CH_2CH_2CH_3$), 2-pentyl (—$CH(CH_3)CH_2CH_2CH_3$), 3-pentyl (—$CH(CH_2CH_3)_2$), 2-methyl-2-butyl (—$C(CH_3)_2CH_2CH_3$), 3-methyl-2-butyl (—$CH(CH_3)CH(CH_3)_2$), 3-methyl-1-butyl (—$CH_2CH_2CH(CH_3)_2$), 2-methyl-1-butyl (—$CH_2CH(CH_3)CH_2CH_3$), 1-hexyl (—$CH_2CH_2CH_2CH_2CH_2CH_3$), 2-hexyl (—$CH(CH_3)CH_2CH_2CH_2CH_3$), 3-hexyl (—$CH(CH_2CH_3)(CH_2CH_2CH_3)$), 2-methyl-2-pentyl (—$C(CH_3)_2CH_2CH_2CH_3$), 3-methyl-2-pentyl (—$CH(CH_3)CH(CH_3)CH_2CH_3$), 4-methyl-2-pentyl (—$CH(CH_3)CH_2CH(CH_3)_2$), 3-methyl-3-pentyl (—$C(CH_3)(CH_2CH_3)_2$), 2-methyl-3-pentyl (—$CH(CH_2CH_3)CH(CH_3)_2$), 2,3-dimethyl-2-butyl (—$C(CH_3)_2CH(CH_3)_2$), 3,3-dimethyl-2-butyl (—$CH(CH_3)C(CH_3)_3$), 1-heptyl (—$CH_2(CH_2)_5CH_3$), 1-octyl (—$CH_2(CH_2)_6CH_3$), 1-nonyl (—$CH_2(CH_2)_7CH_3$), 1-decyl (—$CH_2(CH_2)_8CH_3$), 1-undecyl (—$CH_2(CH_2)_9CH_3$) and 2-dodecyl (—$CH_2(CH_2)_{10}CH_3$).

The term "$C_1$-$C_{12}$-alkyloxy" means a $C_1$-$C_{12}$-alkyl group (i.e. a saturated linear or branched-chain monovalent hydrocarbon radical of one to twelve carbon atoms ($C_1$-$C_{12}$)), which is linked to the rest of the molecule through an oxygen atom.

Preferably, in general formula (II) the substituents $R^1$, $R^2$, $R^4$, $R^5$, $R^6$, $R^7$, $R^9$ and $R^{10}$ represent hydrogen. Hence, a preferred cationic photoinitiator is a compound of general formula (II-a)

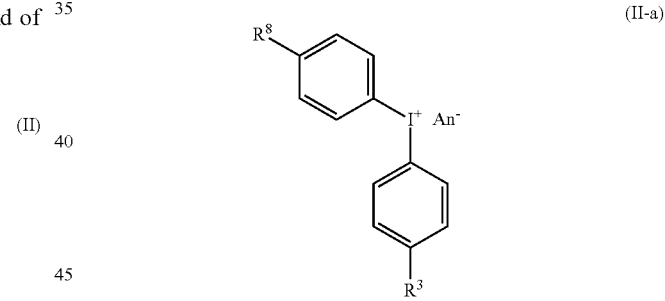

(II-a)

wherein
$An^-$ has the meaning defined herein; and
$R^3$ and $R^8$ are independently of each other selected from hydrogen, a $C_1$-$C_{18}$-alkyl group, and a $C_1$-$C_{12}$-alkyloxy group, preferably selected from hydrogen and a $C_1$-$C_{18}$-alkyl group, more preferably selected from hydrogen and a $C_1$-$C_{12}$-alkyl group, and especially preferably selected from a $C_1$-$C_4$-alkyl group, such as methyl (Me, —$CH_3$), ethyl (Et, —$CH_2CH_3$), 1-propyl (n-Pr, n-propyl, —$CH_2CH_2CH_3$), 2-propyl (i-Pr, iso-propyl, —$CH(CH_3)_2$), 1-butyl (n-Bu, n-butyl, —$CH_2CH_2CH_2CH_3$), 2-methyl-1-propyl (i-Bu, i-butyl, —$CH_2CH(CH_3)_2$), 2-butyl (s-Bu, s-butyl, —$CH(CH_3)CH_2CH_3$), 2-methyl-2-propyl (t-Bu, t-butyl, —$C(CH_3)_3$).

Preferably, in general formulae (II) and (II-a), the anion $An^-$ represents $PF_6^-$.

Particularly suitable diaryl iodonium salts of genera formula (II) and (II-a) are commercially available known under the name DEUTERON UV 1240 (CAS Nr 71786-70-4), DEUTERON UV 1242 (mixture of CAS Nr 71786-70-4 and CAS Nr 68609-97-2), DEUTERON UV 2257 (mixture of CAS Nr 60565-88-0 and CAS Nr 108-32-7), DEUTERON UV 1250 (mixture of branched bis-(($C_{10}$-$C_{13}$)alkylphenyl)-iodoniumhexafluoroantimonate and CAS Nr 68609-97-2), and DEUTERON UV 3100 (mixture of branched bis-(($C_7$-$C_{10}$)alkylphenyl)-iodonium hexafluorophosphate and CAS Nr. 68609-97-2), all available from DEUTERON, OMNICAT 250 (CAS Nr 344562-80-7), OMNICAT 440 (CAS Nr 60565-88-0), and OMNICAT 445 (mixture of CAS Nr 60565-88-0 and CAS Nr 3047-32-3), all available from IGM Resins, SpeedCure 937 (CAS Nr 71786-70-4), SpeedCure 938 (CAS Nr 61358-25-6) and SpeedCure 939 (CAS Nr 178233-72-2), all available from Lambson.

The hybrid UV-LED curable protective varnish according to the present invention comprises a) from about 60 wt-% to about 85 wt-%, preferably from about 65 wt-% to about
80 wt-%, more preferably from about 70 wt-% to about 80 wt-%, of either a cycloaliphatic epoxide, or a mixture of a cycloaliphatic epoxide and one or more cationically curable monomers other than the cycloaliphatic epoxide.

Preferably, the hybrid UV-LED curable protective varnish claimed and described herein comprises from about 60 wt-% to about 85 wt-%, more preferably from about 65 wt-% to about 80 wt-%, especially preferably from about 70 wt-% to about 80 wt-%, of a mixture of a cycloaliphatic epoxide and one or more cationically curable monomers other than the cycloaliphatic epoxide. More preferably, the hybrid UV-LED curable protective varnish claimed and described herein comprising the mixture of a cycloaliphatic epoxide and one or more cationically curable monomers other than the cycloaliphatic epoxide, contains at least 60 wt-% of the cycloaliphatic epoxide, the weight percents being based on the total weight of the hybrid UV-LED radiation curable protective varnish.

As well known to the skilled person, a cycloaliphatic epoxide is a cationically curable monomer containing at least a substituted or unsubstituted epoxycyclohexyl residue:

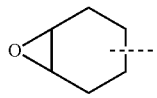

Preferably, the cycloaliphatic epoxide described herein comprises at least one cyclohexane ring, and at least two epoxide groups. More preferably, the cycloaliphatic epoxide is a compound of general formula (III):

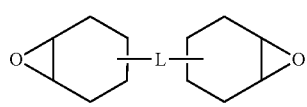

(III)

wherein -L- represents a single bond or a divalent group comprising one or more atoms. The cycloaliphatic epoxide of general formula (III) is optionally substituted by one or more linear or branched alkyl radicals containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl).

In the general formula (III), the divalent group -L- may be a straight- or branched-chain alkylene group comprising from one to eighteen carbon atoms. Examples of said straight- or branched-chain alkylene group include without limitation methylene group, methylmethylene group, dimethylmethylene group, ethylene group, propylene group, and trimethylene group.

In the general formula (III), the divalent group -L- may be a divalent alicyclic hydrocarbon group or cycloalkydene group, such as 1,2-cyclopentylene group, 1,3-cyclopentylene group, cyclopentylidene group, 1,2-cyclohexylene group, 1,3-cyclohexylene group, 1,4-cyclohexylene group, and cyclohexylidene group.

In the general formula (III), -L- may be a divalent group comprising one or more oxygen-containing linkage groups, wherein said oxygen-containing linkage groups are selected from the group consisting of —C(=O)—, —OC(=O)O—, —C(=O)O—, and —O—. Preferably, the cycloaliphatic epoxide is a cycloaliphatic epoxide of general formula (III), wherein -L- is a divalent group comprising one or more oxygen-containing linkage groups, wherein said oxygen-containing linkage groups are selected from the group consisting of —C(=O)—, —OC(=O)O—, —C(=O)O—, and —O—, and more preferably a cycloaliphatic epoxide of general formula (III-a), (III-b), or (III-c), as defined below:

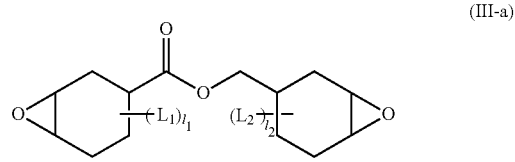

(III-a)

wherein
$L_1$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);
$L_2$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl); and
$I_1$ and $I_2$ are independently of each other integers comprised between 0 and 9, preferably comprised between 0 and 3, and more preferably 0;

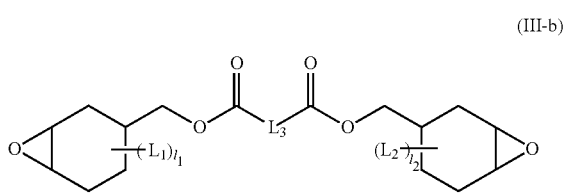

(III-b)

wherein
$L_1$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);

$L_2$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl); and $I_1$ and $I_2$ are independently of each other integers comprised between 0 and 9, preferably comprised between 0 and 3, and more preferably 0;

-$L_3$- is a single bond or a linear or branched divalent hydrocarbon group containing from one to ten carbon atoms, and preferably containing from three to eight carbon atoms, such as alkylene groups including trimethylene, tetramethylene, hexamethylene, and 2-ethylhexylene, and cycloalkylene groups such as 1,2-cyclohexylene group, 1,3-cyclohexylene group, and 1,4-cyclohexylene group, and cyclohexylidene group;

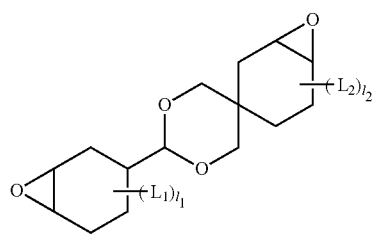

(III-c)

wherein $L_1$ can be the same, or different in each occurrence and is a linear or branched alkyl radical containing from one to three carbon atoms, such as methyl, ethyl, n-propyl, and i-propyl;

$L_2$ can be the same, or different in each occurrence and is a linear or branched alkyl radical containing from one to three carbon atoms, such as methyl, ethyl, n-propyl, and i-propyl; and $I_1$ and $I_2$ are independently of each other integers comprised between 0 and 9, preferably comprised between 0 and 3, and more preferably 0.

Preferred cycloaliphatic epoxides of general formula (III-a) include, but are not limited to: 3,4-epoxycyclohexylmethyl-3,4-epoxycyclohexanecarboxylate (CAS Nr 2386-87-0), 3,4-epoxy-6-methyl-cyclohexyl-methyl-3,4-epoxy-6-methylcyclohexanecarboxylate, 3,4-epoxy-2-methyl-cyclohexylmethyl-3,4-epoxy-2-methyl-cyclohexanecarboxylate, and 3,4-epoxy-4-methyl-cyclohexylmethyl-3,4-epoxy-4-methylcyclohexanecarboxylate.

Preferred cycloaliphatic epoxides of general formula (III-b) include, but are not limited to: bis(3,4-epoxycyclohexylmethyl)adipate, bis(3,4-epoxy-6-methylcyclohexylmethyl)adipate, bis(3,4-epoxycyclohexylmethyl)oxalate, bis(3,4-epoxycyclohexylmethyl)pimelate, and bis(3,4-epoxycyclohexylmethyl)sebacate.

A preferred cycloaliphatic epoxide of general formula (III-c) is 2-(3,4-epoxycyclohexyl-5,5-spiro-3,4-epoxy)cyclohexane-meta-dioxane.

Further cycloaliphatic epoxides include a cycloaliphatic epoxide of general formula (IV-a) and a cycloaliphatic epoxide of general formula (IV-b), which are optionally substituted by one or more linear or branched alkyl groups containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl)

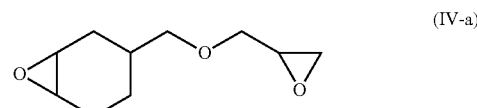

(IV-a)

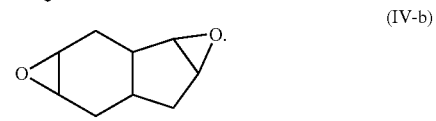

(IV-b)

The cycloaliphatic epoxides described herein may be hydroxy modified or (meth)acrylate modified. Examples are commercially available under the name Cyclomer A400 (CAS: 64630-63-3) and Cyclomer M100 (CAS number: 82428-30-6) by Daicel Corp., or TTA 15 and TTA16 by TetraChem/Jiangsu.

The one or more cationically curable monomers other than the cycloaliphatic epoxide described herein are selected from the group consisting of: vinyl ethers, propenyl ethers, cyclic ethers other than a cycloaliphatic epoxide, including epoxides other than a cycloaliphatic epoxide, oxetanes, and tetrahydrofuranes, lactones, cyclic thioethers, vinyl thioethers, propenyl thioethers, hydroxyl-containing compounds, and mixtures thereof, preferably from the group consisting of: vinyl ethers, cyclic ethers other than a cycloaliphatic epoxide, particularly oxetanes, and mixtures thereof.

Vinyl ethers are known in the art to accelerate curing and reduce tackiness, thus limiting the risk of blocking and set-off when the coated sheets are put in stacks just after coating. They also improve the physical and chemical resistance of the protective coating, and enhance its flexibility and its adhesion to the substrate, which is particularly advantageous for coating plastic and polymer substrates. Vinyl ethers also help reducing the viscosity of the varnish, while strongly co-polymerizing with the varnish vehicle. Examples of preferred vinyl ethers to be used in the hybrid UV-LED radiation curable protective varnish claimed herein include methyl vinyl ether, ethyl vinyl ether, n-propyl vinyl ether, n-butyl vinyl ether, iso-butyl vinyl ether, ethylhexyl vinyl ether, octadecyl vinyl ether, dodecyl vinyl ether, iso-propyl vinyl ether, tert-butyl vinyl ether, tert-amyl vinyl ether, cyclohexyl vinyl ether, cyclohexanedimethanol monovinyl ether, cyclohexanedimethanol divinyl ether, 4-(vinyloxy methyl)cyclohexylmethyl benzoate, phenyl vinyl ether, methylphenyl vinyl ether, methoxyphenyl vinyl ether, 2-chloroethyl vinyl ether, 2-hydroxyethyl vinyl ether, 4-hydroxybutyl vinyl ether, 1,6-hexanediol monovinyl ether, ethylene glycol divinyl ether, ethylene glycol monovinyl ether, 1, 4-butanediol divinyl ether, 1,6-hexanediol divinyl ether, 4-(vinyloxy)butyl benzoate, bis[4-(vinyl oxy)butyl] adipate, bis[4-(vinyloxy)butyl]succinate, bis[4-(vinyloxymethyl) cyclohexylmethyl]glutarate, 4-(vinyloxy)butyl stearate, trimethylolpropane trivinyl ether, propenyl ether of propylene carbonate, diethylene glycol monovinyl ether, diethylene glycol divinyl ether, ethylene glycol butylvinyl ether, dipropylene glycol divinyl ether, triethylene glycol divinyl ether, triethylene glycol methyl vinyl ether, triethylene glycol monobutyl vinylether, tetraethylene glycol divinyl ether, poly(tetrahydrofuran) divinyl ether, polyethyleneglycol-520 methyl vinyl ether, pluriol-E200 divinyl ether, tris[4-(vinyloxy)butyl]trimellitate, 1,4-bis(2-vinyloxyethoxy) benzene, 2,2-bis(4-vinyloxyethoxyphenyl)propane, bis[4-(vinyloxy)methyl]cyclohexyl]methyl]terephthalate, bis[4-(vinyloxy)methyl]cyclohexyl]methyl] isophthalate. Suitable vinyl ethers are commercially sold by BASF under the designation EVE, IBVE, DDVE, ODVE, BDDVE, DVE-2, DVE-3, CHVE, CHDM-di, HBVE. The one or more vinyl ethers described herein may be hydroxy modified or (meth)acrylate modified (for example: VEEA, 2-(2-vinyloxyethoxy)ethyl acrylate from Nippon Shokubai (CAS: 86273-46-3)).

The use of epoxides other than a cycloaliphatic epoxide in the hybrid UV-LED radiation curable protective varnish claimed and described herein aids in accelerating curing and reducing tackiness, as well as in reducing the viscosity of the varnish, while strongly co-polymerizing with the varnish vehicle. Preferred examples of an epoxide other than a cycloaliphatic epoxide as described herein include, but are not limited to, cyclohexane dimethanol diglycidylether, poly(ethyleneglycol) diglycidyl ether, poly(propyleneglycol) diglycidyl ether, butanediol diglycidyl ether, hexanediol diglycidyl ether, bisphenol-A diglycidyl ether, neopentylglycol diglycidylether, trimethylolpropane triglycidyl ether, glycerol triglycidyl ether, pentaerythritol tetraglycidyl ether, butyl glycidyl ether, p-tert-butyl phenyl glycidyl ether, hexadecyl glycidyl ether, 2-ethyl-hexyl glycidyl ether, octyl glycidyl ether, decyl glycidyl ether, dodecyl glycidyl ether, tetradecyl glycidyl ether, $C_{12}/C_{14}$-alkyl glycidyl ether, $C_{13}/C_{15}$-alkyl glycidyl ether and mixtures thereof. Suitable epoxides other than a cycloaliphatic epoxide are commercially sold by EMS Griltech under the trademark Grilonit® (e.g. Grilonit® V51-63 or RV 1806).

A preferred embodiment according to the present invention is directed to a hybrid UV-LED radiation curable protective varnish as claimed and described herein comprising:
  a) from about 60 wt-% to about 85 wt-%, preferably from about 65 wt-% to about 80 wt-%, more preferably from about 70 wt-% to about 80-wt %, of a mixture of a cycloaliphatic epoxide and one or more oxetanes.

Oxetanes are known in the art to accelerate curing and reduce tackiness, thus limiting the risk of blocking and set-off when the printed sheets are put in stacks just after coating. They also help reducing the viscosity of the varnish, while strongly co-polymerizing with the varnish vehicle. Examples of oxetanes include, but are not limited to, trimethylene oxide, 3,3-dimethyloxetane (CAS Nr 6921-35-3), 3-ethyloxetane-3-methanol (CAS Nr 3047-32-3), 3-ethyl-3-[(2-ethylhexyloxy) methyl]oxetane (CAS Nr 298695-60-0), 3-ethyl-3-phenoxymethyl oxetane (CAS Nr 3897-65-2), bis ([1-ethyl(3-oxetanyl)]methyl) ether (CAS Nr 18934-00-4), 1,4-bis[3-ethyl-3-oxetanyl methoxy)methyl]benzene (CAS Nr 142627-97-2), 3,3-dimethyl-2(4-methoxy-phenyl)-oxetane (CAS Nr 74267-45-1), 4,4-bis(3-ethyl-3-oxetanyl) methoxymethyl]biphenyl (CAS Nr 358365-48-7) and (3-ethyl-3-oxetanyl)methyl methacrylate (CAS Nr 37674-57-0). Preferred oxetanes are 3-ethyl-3-hydroxymethyl oxetane (sold by Perstorp under the tradename Curalite™Ox), bis ([1-ethyl(3-oxetanyl)]methyl) ether (sold by Perstorp under the tradename Curalite™OxPlus), 3-ethyl-3-phenoxymethyl oxetane (sold by Lambson under the tradename UviCure S140), 1,4-bis[3-ethyl-3-oxetanyl methoxy)methyl]benzene (sold by Lambson under the tradename UviCure S150), 4,4-bis(3-ethyl-3-oxetanyl)methoxymethyl]biphenyl (sold by Lambson under the tradename UviCure S160) and (3-ethyl-3-oxetanyl)methyl methacrylate (sold by Lambson under the tradename UViCure S170).

The hybrid UV-LED radiation curable protective varnish claimed and described herein comprises
  b) from about 3 wt-% to about 15 wt-%, preferably from about 6 wt-% to about 10 wt-%, more preferably about 8 wt-% of one or more radically curable monomers and/or oligomers.

The radically curable monomer described herein is selected from the group consisting of mono(meth)acrylates, di(meth)acrylates, tri(meth)acrylates, tetra(meth)acrylates and mixtures thereof, preferably from the group consisting of di(meth)acrylates, tri(meth)acrylates, and mixtures thereof.

The term "(meth)acrylate" in the context of the present invention refers to the acrylate, as well as the corresponding methacrylate.

Preferred examples of mono(meth)acrylates include 2(2-ethoxyethoxy)ethyl (meth)acrylate, 2-phenoxyethyl (meth)acrylate, C12/C14 alkyl (meth)acrylate, C16/C18 alkyl (meth)acrylate, caprolactone (meth)acrylate, cyclic trimethylolpropane formal (meth)acrylate, nonylphenol (meth)acrylate, isobornyl (meth)acrylate, isodecyl (meth)acrylate, lauryl (meth)acrylate, stearyl (meth)acrylate, octyldecyl (meth)acrylate, tridecyl (meth)acrylate, methoxy poly(ethylene glycol) (meth)acrylate, polypropylene glycol (meth) acrylate, tetrahydrofurfuryl (meth)acrylate, 1,3-butylene glycol di(meth)acrylate, 1,4-butanediol di(meth)acrylate, 1,6-hexanediol di(meth)acrylate, 3-methyl-1,5-pentanedioldi(meth)acrylate, alkoxylated di(meth)acrylate, esterdiol di(meth)acrylate, as well as mixtures thereof.

Preferred examples of di(meth)acrylates include bisphenol A di(meth)acrylates, alkoxylated (such as for example ethoxylated and propoxylated) bisphenol A di(meth)acrylate, bisphenol A diglycidyl ether di(meth)acrylate, ethylene glycol di(meth)acrylate, diethylene glycol di(meth)acrylate, triethylene glycol di(meth)acrylate, tetraethylene glycol di(meth)acrylate, dipropyleneglycol di(meth)acrylate, tripropylene glycol di(meth)acrylate, polyethylene glycol di(meth)acrylate, neopentyl glycol di(meth)acrylate, tricyclodecane dimethanol di(meth)acrylate, as well as mixtures thereof.

Preferred examples of tri(meth)acrylates include trimethylolpropane tri(meth)acrylates, alkoxylated (such as for example ethoxylated and propoxylated) trimethylolpropane tri(meth)acrylates, alkoxylated (such as for example ethoxylated and propoxylated) glycerol tri(meth)acrylates, pentaerythritol tri(meth)acrylates, alkoxylated pentaerythritol tri(meth)acrylates, alkoxylated (such as for example ethoxylated and propoxylated) pentaerythritol tri(meth)acrylates, as well as mixtures thereof.

Preferred examples of tetra(meth)acrylates include ditrimethylolpropane tetra(meth)acrylates, pentaerythritol tetra(meth)acrylates, alkoxylated (such as for example ethoxylated and propoxylated) pentaerythritol tetra(meth)acrylates and mixtures thereof.

As used herein, the term "radically curable oligomer" refers to a radically curable (meth)acrylate oligomer that may be branched or essentially linear, and may have terminal and/or pendant (meth)acrylate functional group(s). Preferably, the radically curable oligomer is selected from the group consisting of (meth)acrylic oligomers, urethane (meth)acrylate oligomers, polyester (meth)acrylate oligomers, polyether based (meth)acrylate oligomers, epoxy (meth) acrylate oligomers, and mixtures thereof, more preferably selected from the group consisting of polyester (meth) acrylate oligomers, epoxy (meth)acrylate oligomers, and mixtures thereof.

Suitable examples of epoxy (meth)acrylate oligomer include without limitation aliphatic epoxy (meth)acrylate oligomers, in particular mono(meth)acrylates, di(meth)acrylates and tri(meth)acrylates, and aromatic epoxy (meth) acrylate oligomers. Suitable examples of aromatic epoxy (meth)acrylate oligomers include bisphenol-A (meth)acrylate oligomers, such as bisphenol-A mono(meth)acrylates, bisphenol-A di(meth)acrylates and bisphenol-A tri(meth) acrylates as well as alkoxylated (such as for example ethoxylated and propoxylated) bisphenol-A (meth)acrylate oligomers such as for example alkoxylated bisphenol-A mono(meth)acrylates, alkoxylated bisphenol-A di(meth) acrylates and alkoxylated bisphenol-A tri(meth)acrylates, preferably alkoxylated bisphenol-A di(meth)acrylates.

The hybrid UV-LED radiation curable protective varnish claimed and described herein comprises d) from about 0.5 wt-% to about 3 wt-%, preferably from about 1 wt-% to about 2 wt-%, more preferably about 1.5 wt-% of a free radical photoinitiator selected from the group consisting of alpha-hydroxyketones, alpha-alkoxyketones, benzyl diketals, benzoin ethers, phosphine oxides, phenylglyoxylates, and mixtures thereof.

The free radical photoinitiator used in the hybrid UV-LED radiation curable protective varnish claimed and described herein is selected from the group consisting of alpha-hydroxyketones, alpha-alkoxyketones, benzyl diketals, benzoin ethers, phosphine oxides, phenylglyoxylates, and mixtures thereof.

Suitable alpha-hydroxyketones include without limitation 2-hydroxy-4'-hydroxyethoxy-2-methylpropiophenone (CAS Nr 106797-53-9), 1-hydroxycyclohexyl phenyl ketone (CAS Nr 947-19-3), 2-hydroxy-2-methyl-1-phenylpropan-1-one (CAS Nr 7473-98-5), 2-hydroxy-2-methyl-1-(4-tert-butyl)phenylpropan-1-one (CAS Nr 68400-54-4), 2-hydroxy-1-[4-[[4-(2-hydroxy-2-methylpropanoyl)phenyl] methyl]phenyl]-2-methylpropan-1-one (CAS Nr 474510-57-1), 2-hydroxy-1-[4-[4-(2-hydroxy-2-methylpropanoyl) phenoxy]phenyl]-2-methylpropan-1-one (CAS Nr 71868-15-0), 2-hydroxy-1-[1-[4-(2-hydroxy-2-methylpropanoyl) phenyl]-1,3,3-trimethylindan-5-yl]-2-methylpropan-1-one (CAS Nr 135452-43-6), poly(oxy-1,2-ethanediyl), α-(1,1-dimethyl-2-oxo-2-phenylethyl)-ω-hydroxy- (CAS Nr 554449-21-7), and oligo[2-hydroxy-2-methyl-1-[4-(1-methylvinyl)phenyl]propanone] (CAS Nr 163702-01-0).

Suitable benzyl diketals include without limitation 2,2-dimethoxy-2-phenylacetophenone (CAS Nr 24650-42-8), and 2,2-diethoxy-1-phenyl-1-ethanone (CAS Nr 6175-45-7).

Suitable phenyl glyoxylates include without limitation 2-oxo-2-phenylacetic acid methyl ester (methyl benzoylformate, CAS Nr 15206-55-0), 2-[2-ω-2-phenyl-acetoxyethoxy]ethyl 2-oxo-2-phenylacetate (CAS Nr 211510-16-6), α-(2-oxo-2-phenylacetyl)-ω-[(2-oxo-2-phenylacetyl)oxy]-poly(oxy-1,4-butanediyl) (CAS Nr 1313205-82-1), and 2-(2-hydroxyethoxy)ethyl 2-oxo-2-phenylacetate (CAS Nr 442536-99-4).

Suitable benzoin ethers include without limitation 2-ethoxy-1,2-diphenylethanone (CAS Nr 574-09-4), 2-isopropoxy-1,2-diphenylethanone (CAS Nr 6652-28-4), 2-isobutoxy-1,2-diphenylethanone (CAS Nr 22499-12-3), and 2-butoxy-1,2-diphenylethanone (CAS Nr 22499-11-2).

Suitable phosphine oxides include without limitation 2,3,6-trimethylbenzoyldiphenylphosphine oxide (CAS Nr 144865-32-7), 2,4,6-trimethylbenzoyldiphenylphosphine oxide (CAS Nr 75980-60-8), ethyl(2,4,6-trimethylbenzoyl) phenylphosphinate (CAS Nr 84434-11-7), ethyl phenyl(2,4,6-trimethylbenzoyl)phenylphosphinate (CAS Nr 1539267-56-5), phenylbis(2,4,6-trimethylbenzoyl)phosphine oxide (CAS Nr 162881-26-7), bis(2,6-dimethoxybenzoyl)-2,4,4-trimethylpentylphosphine oxide (CAS Nr 145052-34-2), as well as oligomeric phosphine oxides such as poly(oxy-1,2-ethanediyl), α,α',α''-1,2,3-propanetriyltris[ω-[[phenyl(2,4,6-trimethylbenzoyl)phosphinyl]oxy]-(CAS Nr 1834525-17-5) and poly(oxy-1,2-ethanediyl), α-[bis(2,4,6-trimethylbenzoyl)phosphinyl]-ω-methoxy- (CAS Nr 1613725-81-7).

The hybrid UV-LED radiation curable protective varnish claimed and described herein may contain a mixture of the above-identified free radical photoinitiators. Such mixtures include for example a mixture of 2,4,6-trimethylbenzoyldiphenylphosphine oxide (CAS Nr 75980-60-8) and 2-hydroxy-2-methyl-1-phenylpropan-1-one (CAS Nr 7473-98-5), sold e.g. by IGM Resins under the tradename Omnirad 4265; a mixture of phenylbis(2,4,6-trimethylbenzoyl)phosphine oxide (CAS Nr 162881-26-7), ethyl(2,4,6-trimethylbenzoyl)phenylphosphinate (CAS Nr 84434-11-7) and 2-hydroxy-2-methylpropiophenone (CAS Nr 7473-98-5), sold e.g. by IGM Resins under the tradename Omnirad 2022; a mixture of ethyl(2,4,6-trimethylbenzoyl)phenylphosphinate (CAS Nr 84434-11-7) and phenylbis(2,4,6-trimethylbenzoyl)phosphine oxide (CAS Nr 162881-26-7), sold e.g. by IGM Resins under the tradename Omnirad 2100; a mixture of 2-hydroxy-2-methylpropiophenone (CAS Nr 7473-98-5) and 1-hydroxycyclohexyl phenyl ketone (CAS Nr 947-19-3), sold e.g. by IGM Resins under the tradename Omnirad 1000; a mixture of oligo[2-hydroxy-2-methyl-1-[4-(1-methylvinyl)phenyl]propanone] (CAS Nr 163702-01-0) and 2-hydroxy-2-methylpropiophenone (CAS Nr 7473-98-5), sold e.g. by IGM Resins under the tradename Esacure KIP100F; a mixture of 2-hydroxy-2-methylpropiophenone (CAS Nr 7473-98-5), ethyl(2,4,6-trimethylbenzoyl)phenylphosphinate (CAS Nr 84434-11-7) and oligo[2-hydroxy-2-methyl-1-[4-(1-methylvinyl)phenyl]propanone] (CAS Nr 163702-01-0), sold by IGM Resins under the tradename Omnirad BL 723; as well as a mixture of 2-hydroxy-2-methylpropiophenone (CAS Nr 7473-98-5), oligo[2-hydroxy-2-methyl-1-[4-(1-methylvinyl)phenyl]propanone] (CAS Nr 163702-01-0), ethyl(2,4,6-trimethylbenzoyl) phenylphosphinate (CAS Nr 84434-11-7) and 2,2-dimethoxy-1,2-diphenylethan-1-one (CAS Nr 24650-42-8), sold by IGM Resins under the tradename Omnirad BL 724.

Preferably the free radical photoinitiator is selected form the group consisting of alpha-hydroxyketones, benzyl diketals, phenylglyoxylates, and mixtures thereof, and more preferably from the group consisting of 2-hydroxy-4'-hydroxyethoxy-2-methylpropiophenone (CAS Nr 106797-53-9), 1-hydroxycyclohexyl phenyl ketone (CAS Nr 947-19-3), methyl benzoylformate (CAS Nr 15206-55-0), 2,2-dimethoxy-1,2-diphenylethan-1-one (CAS Nr 24650-42-8), and mixtures thereof.

The hybrid UV-LED radiation curable protective varnish claimed and described herein comprises e) from about 0.01 wt-% to about 5 wt-%, preferably from about 0.05 wt-% to about 3 wt-%, more preferably from about 0.1 wt-% to about 2 wt-%, even more preferably from about 0.2 wt-% to about 1 wt-%, of a non-ionic surfactant.

As well known to a skilled person, a non-ionic surfactant contains a hydrophilic moiety and a hydrophobic moiety and carries no charge. Preferably, the non-ionic surfactant used in the hybrid UV-LED curable protective varnish claimed and described herein has a molecular weight of between about 200 g/mol and about 3000 g/mol, and/or contains one or more functional groups selected from hydroxyl and epoxide groups. More preferably, the non-ionic surfactant is selected from a non-ionic fluorinated surfactant and a non-ionic silicone surfactant.

As used herein the term "non-ionic fluorinated surfactant" includes non-ionic perfluoropolyether surfactants and non-ionic fluorosurfactants.

As used herein, the term "non-ionic perfluoropolyether surfactant" denotes a non-ionic surfactant comprising a perfluoropolyether backbone and one or more, preferably two or more, terminal functional groups selected from the group consisting of: hydroxyl, epoxide, acrylate, methacrylate and trialkoxysilyl, preferably selected from the group consisting of hydroxyl and epoxide. Preferably, the non-ionic perfluoropolyether surfactant is characterized by an average molecular weight ($M_n$) below about 2000 [g/mol]. As used herein, a perfluoropolyether backbone denotes a residue of a perfluoropolyether polymer comprising randomly distributed recurring units selected from perfluoromethyleneoxy (—$CF_2O$—) and perfluoroethyleneoxy (—$CF_2$—$CF_2O$—). The perfluoropolyether residue is connected to the terminal functional group directly or via a spacer selected from methylene(oxyethylene), 1,1-difluoroethylene-(oxyethylene), methylene-di(oxyethylene), 1,1-difluoroethylene-di(oxyethylene), methylene-tri(oxyethylene), 1,1-difluoroethylene-tri(oxyethylene), methylene-tetra(oxyethylene), 1,1-difluoroethylene-tetra(oxyethylene), methylene-penta(oxyethylene), 1,1-difluoroethylene-penta(oxyethylene), and a linear or branched hydrocarbon group, optionally fluorinated at the carbon atom connecting the spacer to the perfluoropolyether residue, containing one or more urethane groups, or one or more amide groups, and optionally one or more cyclic moieties, including saturated cyclic moieties (such as cyclohexylene) and aromatic cyclic moieties (such as phenylene). Preferably, the non-ionic perfluoropolyether surfactant is functionalized with one or more hydroxyl and/or epoxide functional groups.

Preferably, the non-ionic perfluoropolyether surfactant is a compound of general formula (V) having an average molecular weight ($M_n$) from about 1200 [g/mol] to about 2000 [g/mol]

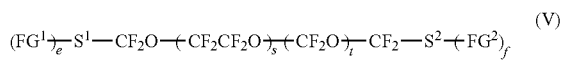

(V)

wherein
f and e are independently of each other integers selected from 1, 2 and 3; $FG^1$ and $FG^2$ are terminal functional groups selected independently of each other from the group consisting of:

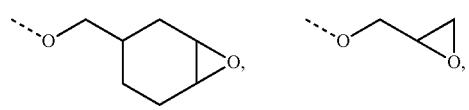

—OH, —OC(O)CH=$CH_2$,
—OC(O)C($CH_3$)=$CH_2$, and —Si($OR^{20}$)$_3$;
$R^{20}$ is a $C_1$-$C_4$ alkyl group;
—$S^1$— represents a single bond or a spacer selected from:

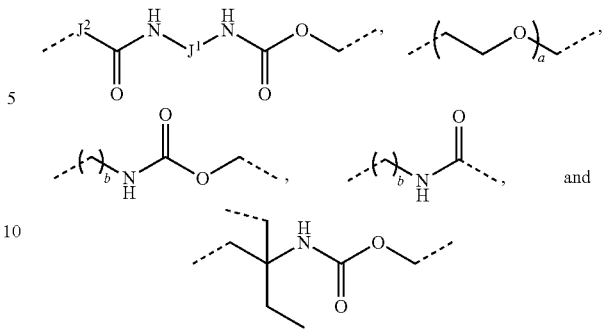

wherein
-$J^1$- is selected from

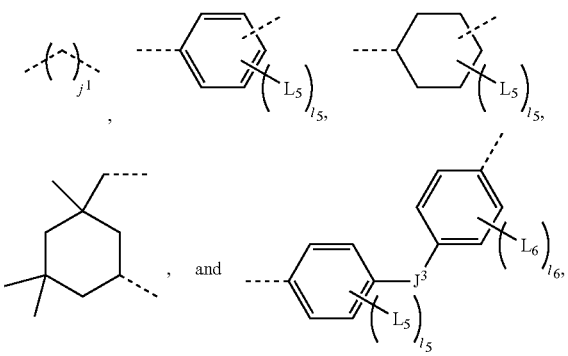

wherein
$j^1$ is an integer comprised between 1 and 12, preferably between 4 and 10;
$L_5$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);
$L_6$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);
$l_5$ and $l_6$ are independently of each other integers comprised between 0 and 4, preferably comprised between 0 and 1; and
-$J^3$- is selected from —O—, —$CH_2$—, —CH($CH_3$)—, and —C($CH_3$)$_2$—;
-$J^2$- is selected from

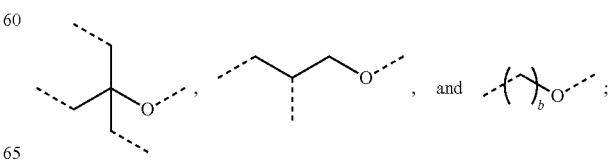

a is an integer comprised between 1 and 6, preferably between 1 and 3; and b is an integer comprised between 1 and 6, preferably between 2 and 4;

—$S^2$— represents a single bond or a spacer selected from

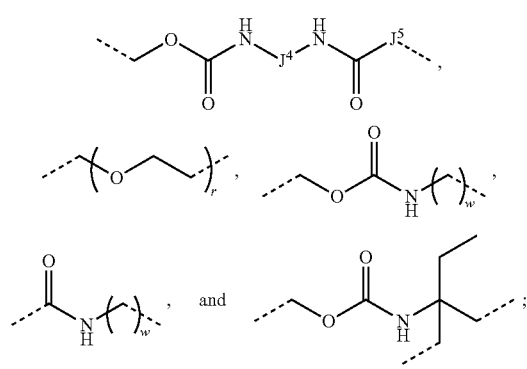

wherein

-$J^4$- is selected from

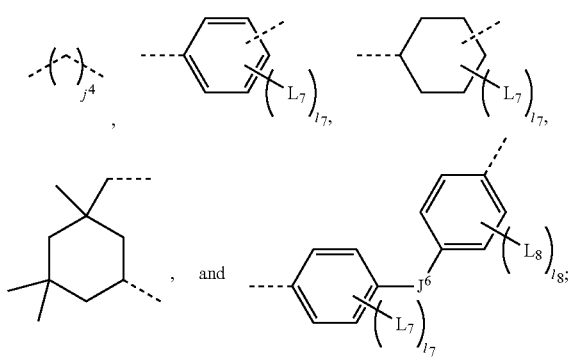

wherein $j^4$ is an integer comprised between 1 and 12, preferably between 4 and 10;

$L_7$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);

$L_8$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);

$l_7$ and $l_8$ are independently of each other integers comprised between 0 and 4, preferably comprised between 0 and 1; and -$J^6$- is selected from —O—, —$CH_2$—, —$CH(CH_3)$—, and —$C(CH_3)_2$—;

-$J^5$- is selected from

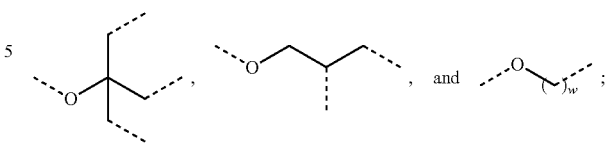

wherein r is an integer comprised between 1 and 6, preferably between 1 and 3; and w is an integer comprised between 1 and 6, preferably between 2 and 4;

and wherein s and t are integers chosen so that the average molecular weight ($M_n$) of the compound of general formula (V) is from about 1200 [g/mol] to about 2000 [g/mol].

Preferably, in general formula (V), $FG^1$ and $FG^2$ represent independently of each other —OC(O)CH=$CH_2$, or —OC(O)C($CH_3$)=$CH_2$;

—$S^1$— represents

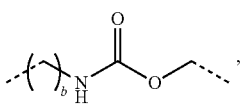

wherein b has the meaning defined herein; and

—$S^2$— represents

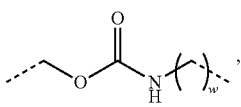

wherein w has the meaning defined herein.

More preferably, in general formula (V), $FG^1$ and $FG^2$ represent —OH;

—$S^1$— represents a single bond or

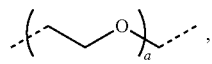

wherein a has the meaning defined herein;

—$S^2$— represents a single bond or

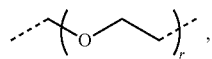

wherein r has the meaning defined herein; and the sum of o and r is comprised between 3 and 9.

Also preferably, in general formula (V), FG$^1$ and FG$^2$ represent —Si(OR$^{20}$)$_3$;

R$^{20}$ is a C$_1$-C$_4$alkyl group, preferably an ethyl group;

S$^1$— represents

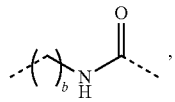

wherein b has the meaning defined herein; and —S$^2$— represents

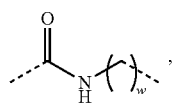

wherein w has the meaning defined herein. Thus, a preferred perfluoropolyether surfactant is a compound of general formula (V-a)

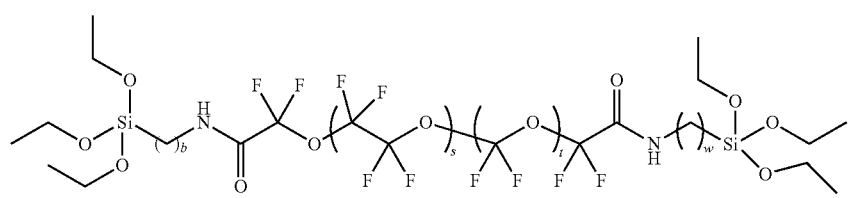

(V-a)

wherein
b and w are integers comprised between 1 and 6, preferably between 2 and 4;
s is a integer of between 2 and 6; and
q is an integer of between 2 and 4.

Particularly suitable examples of non-ionic perfluoropolyether surfactant are commercially available under the name Fluorolink® E10H, Fluorolink® MD700, Fluorolink® MD500 Fluorolink® AD 700, Fluorolink® E-series, and Fluorolink® S10 from Solvay.

As used herein the term "non-ionic fluorosurfactant" refers to a non-ionic surfactant containing a perfluoroalkyl chain CF$_3$(CF$_2$)$_x$, wherein x is an integer from 2 to 18. Preferably, the non-ionic fluorosurfactant is characterized by an average molecular weight (M$_n$) from about 200 [g/mol] to about 2000 [g/mol].

Preferably, the non-ionic fluorosurfactant is a compound of general formula (VI)

CF$_3$(CF$_2$)$_x$(CH$_2$)$_y$E     (VI)

wherein
x is an integer from 2 to 18;
y is an integer from 0 to 8; and
E is selected from
—(CR$_2$CR$_2$O)$_z$H,

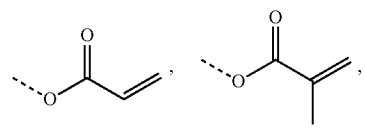

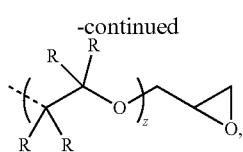

and —OSi(OR$^{20}$)$_3$,
wherein z is an integer from 0 to 15;
R can be the same, or different in each occurrence, and is selected from hydrogen and methyl; and
R$^{20}$ is a C$_1$-C$_4$alkyl group. In the general formula (VI), R preferably represents hydrogen.

A non-ionic fluorosurfactant of general formula (VI-a)

CF$_3$(CF$_2$)$_x$(CH$_2$)$_y$(CR$_2$CR$_2$O)$_z$H     (VI-a)

wherein
x is an integer from 2 to 18;
y is an integer from 0 to 8;
z is an integer from 0 to 15; and
R can be the same, or different in each occurrence, and is selected from hydrogen and methyl, preferably hydrogen is especially preferred. Non-ionic fluorosurfactants of general formula (VI-a) are commercially available under the name CHEMGUARD S550-100 or CHEMGUARD S550, CHEMGUARD S222N, CHEMGUARD S559-100 or CHEMGUARD S559, all commercialized by CHEMGUARD; Capstone™ FS-31, Capstone™ FS-35, Capstone™ FS-34, Capstone™ FS-30, Capstone™ FS-3100, all commercialized by Chemours.

A non-ionic fluorosurfactant of general formula (VI-b)

CF$_3$(CF$_2$)$_x$(CH$_2$)$_y$OSi(OR$^{20}$)$_3$     (VI-b), wherein
x is an integer from 2 to 18;
y is an integer from 0 to 8; and
R$^{20}$ is a C$_1$-C$_4$alkyl group, is also preferred. Non-ionic fluorosurfactants of general formula (VI-b) are commercially available under the name Dynasylan F8261 and Dynasylan F8263 commercialized by Evonik.

A non-ionic fluorosurfactant of general formula (VI-c)

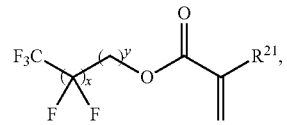

(VI-c)

wherein
x is an integer from 2 to 18;
y is an integer from 0 to 8; and
R$^{21}$ is selected from hydrogen and a methyl group, is also preferred. Examples of non-ionic fluorosurfactants of general formula (VI-c) include, but are not limited to: 1H,1H,2H,2H-perfluorooctyl acrylate (Sigma-Aldrich), 1H,1H,2H,2H-perfluorooctyl methacrylate (Sigma-Aldrich), 1H,1H-perfluorooctyl acrylate (Sigma-Aldrich), 1H,1H-perfluorooctyl methacrylate (Sigma-Aldrich), 1H,1H-perfluoroheptyl acrylate (Sigma-Aldrich) and 1H,1H-perfluoroheptyl methacrylate (Sigma-Aldrich).

As used herein a non-ionic silicone surfactant refers to a non-ionic surfactant comprising a silicone backbone containing randomly distributed recurring units selected from di(methyl)siloxane (—(CH$_3$)$_2$SiO—) and/or methyl-(C$_2$-C$_{10}$-alkyl)-siloxane (—(CH$_3$)(C$_2$-C$_{10}$-alkyl)SiO—), wherein one or more methyl groups and/or C$_2$-C$_{10}$-alkyl groups may be independently of each other substituted by an aryl group, a polyester, optionally presenting a terminal functional group selected from hydroxyl, epoxide, and (meth)acrylate, a polyether, such as polyalkylene glycol, including polyethylene glycol and polypropylene glycol, optionally presenting a terminal functional group selected from hydroxyl, epoxide and (meth)acrylate, a hydroxyl group, an epoxide group, or a (meth)acrylate group, and/or wherein the silicone backbone may be connected directly or via a spacer to a terminal functional group selected from a hydroxyl group, an epoxide group, and a (meth)acrylate group. The silicone backbone described herein may be connected to an aliphatic urethane acrylate or to a fluorine-containing aliphatic urethane acrylate. Preferably, the non-ionic silicone surfactant is characterized by an average molecular weight lower than about 3000 [g/mol]. Non-ionic silicone surfactants include, but are not limited to poly-methyl-alkyl-siloxane, such as BYK-077 and BYK-085 commercialized by BYK, polyester-modified poly-dimethyl-siloxane, such as BYK 310 commercialized by BYK, polyether-modified poly-dimethyl-siloxane, such as BYK-330, BYK-377, BYK-333, BYK-345, BYK-346 and BYK-348 commercialized by BYK, polyester-modified poly-methyl-alkyl-siloxane, such as BYK-315 commercialized by BYK, polyether-modified poly-methyl-alkyl-siloxane, such as BYK-341, BYK-320 and BYK-325 commercialized by BYK, hydroxy-functional poly-dimethyl-siloxane, such as TEGOMER® HSI-2311 commercialized by Evonik, polyester-modified hydroxy-functional poly-dimethyl-siloxane, such as BYK-370 and BYK-373 commercialized by BYK, polyether-modified hydroxy-functional poly-dimethyl-siloxane, such as BYK-308 commercialized by BYK, polyether-polyester modified hydroxy-functional poly-dimethyl-siloxane, such as BYK-375 commercialized by BYK, epoxy-functional poly-dimethyl-siloxane, such as TEGOMER® E-Si 2330 commercialized by Evonik, acryloxy-functional poly-dimethyl-siloxane, such as TEGOMER® V-SI 2250 and TEGO® Rad 2700 commercialized by Evonik, polyester-modified acrylic functional poly-dimethyl-siloxane, such as BYK-371 commercialized by BYK, polyether-modified acrylic functional poly-dimethyl-siloxane, such as TEGO® Rad 2100 and TEGO® Rad 2500 commercialized by Evonik, silicone-modified aliphatic urethane acrylate, such as SUO-S3000 and SUO-S600NM commercialized by Polygon, silicone- and fluorine-modified aliphatic urethane acrylate, such as SUO-FS500 commercialized by Polygon.

To facilitate the security documents storing, stacking and grasping, in particular banknotes storing, stacking and grasping, the hybrid UV-LED radiation curable protective varnish claimed and described herein may contain a matting agent, which provides a matt protective coating with a better grip. Moreover, a matt protective coating has the advantage of retaining the users' accustomed perception of security documents by the sense of touch, and causes much less reflection than a glossy protective coating, thereby, enabling machine checking and authentication of security documents with the optical sensors customarily used. The matting agent may be present in an amount from about 1 wt-% to about 12 wt-%, the weight percents (wt-%) being based on the total weight of the hybrid UV-LED radiation curable protective varnish.

As well known to the skilled person, the use of matting agents should be avoided in the hybrid UV-LED radiation curable protective varnishes intended for production of glossy protective coatings that can be useful for example for protecting the surface of an overt security feature present in a security document. A hybrid UV-LED radiation curable protective varnish as claimed and described herein, which is free of matting agents, provides a glossy protective coating, which is conspicuous and draws the layperson's attention to the security feature covered by the glossy lacquer, thereby aiding the unexperienced users to easily find the security feature on the security document. Such hybrid UV-LED radiation curable protective varnish can be applied directly on the surface of a security feature present in a security document. Furthermore, such matting agent free hybrid UV-LED radiation curable protective varnish may be useful for producing glossy discontinuous protective coatings for security documents as described in the international patent application publication number WO2011120917A1, which present a matt protective coating applied directly on the surface of the security document and a glossy protective coating, which partially covers the surface of the matt protective coating.

The matting agent is preferably selected from inorganic particles and resin particles. Examples of inorganic particles and resin particles include, but are not limited to thermoplastic polymer matting agents, such as thermoplastic polymer microspheres and micronized polyolefin waxes, calcium carbonate matting agents, such as core/shell microparticles comprising a calcium carbonate core and a hydroxyapatite shell, sold under the tradename Omyamatt® 100 by Omya, aluminium oxide matting agents, aluminosilicate matting agents, and amorphous silicon dioxide particles having a porous structure, such as fumed amorphous silicon dioxide particles, precipitated amorphous silicon dioxide particles and amorphous silicon dioxide particles obtained from the sol-gel process.

Preferably, the matting agent is selected from amorphous silicon dioxide particles having a porous structure including organic surface treated amorphous silicon dioxide particles. Such matting agent presents low refractive index resulting in good transmission properties.

The matting agent is preferably characterized by a $D_{50}$ value in the range of from about 1 μm to about 25 μm, preferably from 2 μm to about 15 μm, more preferably between about 3 μm and about 10 μm, as determined by laser diffraction.

Suitable amorphous silicon dioxide particles having a porous structure are commercially available under the name Syloid® from Grace (such as Syloid® C906, Rad 2105, 7000, ED30), Acematt® from Evonik (such as Acematt® OK412, OK500, OK520, OK607, OK900, 3600, TS 100), PPG Lo-Vel® from PPG (such as PPG Lo-Vel® 66, 2023, 8100, 8300), Gasil® from PQ Corporation (such as Gasil® UV55C, UV70C, HP210, HP240, HP380, HP860).

The hybrid UV-LED radiation curable protective varnish may contain up to 10 wt-% of an organic solvent, the weight percents being based on the total weight of the hybrid UV-LED radiation curable protective varnish. Preferably, the organic solvent is present in an amount from about 1 wt-% to about 7.5 wt-%, more preferably from about 2 wt-% to about 5 wt-%. Preferably, the organic solvent is a polar organic solvent selected from alcohols, glycols, glycol ethers, glycol esters and cyclic carbonates, preferably having a boiling point higher than about 80° C., more preferably higher than about 100° C.

The hybrid UV-LED radiation curable protective varnish claimed and described herein may further contain one or more additives including without limitation antifoaming agents, defoaming agents, UV absorbers, anti-sedimentation stabilizers, antimicrobial agents including antibacterial agents, antiviral agents, and antifungal agents, and combinations thereof.

The hybrid UV-LED radiation curable protective varnish described and claimed herein may be prepared by mixing either the cycloaliphatic epoxide, or the mixture of the cycloaliphatic epoxide and the one or more cationically curable monomers other than the cycloaliphatic epoxide, with the one or more radically curable monomers and/or oligomers, the organic solvent when present, the one or more additives when present, the matting agent when present, the non-ionic surfactant, the photosensitizer of general formula (I), the diaryl iodonium salt and the free radical photoinitiator. Preferably, the solid ingredients of the hybrid UV-LED radiation curable protective varnish are dispersed in the mixture of the liquid ingredients contained by said protective varnish. The non-ionic surfactant, the photosensitizer of general formula (I), the diaryl iodonium salt and the free radical photoinitiator may be added to the mixture either during the dispersing or mixing step of all other ingredients, or at a later stage (i.e. just before the application of the hybrid UV-LED radiation curable protective varnish on a surface of a substrate of a security document and/or on a surface of one or more security features of a security document) simultaneously, or in sequence.

Preferably the hybrid UV-LED radiation curable protective varnish is a flexography printing varnish, an inkjet printing varnish, or a screen printing varnish, more preferably a flexography printing varnish.

In a preferred embodiment, the hybrid UV-LED radiation curable protective varnish is a flexography printing varnish. Flexography printing preferably uses a unit with a doctor blade, preferably a chambered doctor blade, an anilox roller and plate cylinder. The anilox roller advantageously has small cells whose volume and/or density determines the curable varnish application rate. The doctor blade lies against the anilox roller, and scraps off varnish surplus at the same time. The anilox roller transfers the varnish to the plate cylinder, which finally transfers the varnish to the substrate. Specific design might be achieved using a designed photopolymer plate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the nonimage areas, which lowers the plate surface in these nonimage areas. After processing, the plate is dried and given a post-exposure dose of UV light to cure the whole plate. Preparation of plate cylinders for flexography is described in *Printing Technology*, J. M. Adams and P. A. Dolin, Delmar Thomson Learning, 5th Edition, pages 359-360. To be suitable to be printed by flexography, the hybrid UV-LED radiation curable protective varnish must have a viscosity in the range of about 50 to about 500 mPas at 25° C. measured using a Brookfield viscometer (model "DV-1 Prime) equipped with a spindle S21 at 100 rpm for measuring viscosities comprised between 100 mPa·s and 500 mPa·s at 25° C., or using a rotational viscosimeter DHR-2 from TA Instruments (cone-plane geometry, diameter 40 mm) for viscosities below 100 mPa·s at 25° C. and 1000 $s^{-1}$.

In a further preferred embodiment according to the present invention, the hybrid UV-LED radiation curable protective varnish is an inkjet printing varnish, preferably a drop-on-demand (DOD) inkjet printing varnish. Drop-on-demand (DOD) printing is a non-contact printing process, wherein the droplets are only produced when required for printing, and generally by an ejection mechanism rather than by destabilizing a jet. Depending on the mechanism used in the printhead to produce droplets, the DOD printing is divided in piezo impulse, thermal jet and valve jet. To be suitable for DOD inkjet printing, the hybrid UV-LED radiation curable protective varnish must have low viscosity of less than about 20 mPa·s at jetting temperature and a surface tension lower than about 45 N/m.

In a still preferred embodiment according to the present invention, the hybrid UV-LED radiation curable protective varnish is a screen printing varnish. As well known to those skilled in the art, screen printing (also referred in the art as silkscreen printing) is a printing technique that typically uses a screen made of woven mesh to support an ink-blocking stencil. The attached stencil forms open areas of mesh that transfer varnish as a sharp-edged image onto a substrate. A squeegee is moved across the screen with ink-blocking stencil, forcing varnish past the threads of the woven mesh in the open areas. A significant characteristic of screen printing is that a greater thickness of the varnish can be applied on the substrate than with other printing techniques. Screen printing is therefore also preferred when varnish deposits with the thickness having a value between about 10 to 50 μm or greater are required which cannot (easily) be achieved with other printing techniques. Generally, a screen is made of a piece of porous, finely woven fabric called mesh stretched over a frame of e.g. aluminum or wood. Currently most meshes are made of man-made materials such as synthetic or steel threads. Preferred synthetic materials are nylon or polyester threads.

In addition to screens made on the basis of a woven mesh based on synthetic or metal threads, screens have been developed out of a solid metal sheet with a grid of holes. Such screens are prepared by a process comprising of electrolytically forming a metal screen by forming in a first electrolytic bath a screen skeleton upon a matrix provided with a separating agent, stripping the formed screen skeleton from the matrix and subjecting the screen skeleton to an electrolysis in a second electrolytic bath in order to deposit metal onto said skeleton.

There are three types of screen printing presses, namely flat-bed, cylinder and rotary screen printing presses. Flat-bed and cylinder screen printing presses are similar in that both use a flat screen and a three-step reciprocating process to perform the printing operation. The screen is first moved into position over the substrate, the squeegee is then pressed against the mesh and drawn over the image area, and then the screen is lifted away from the substrate to complete the process. With a flat-bed press the substrate to be printed is typically positioned on a horizontal print bed that is parallel to the screen. With a cylinder press the substrate is mounted on a cylinder. Flat-bed and cylinder screen printing processes are discontinuous processes, and consequently limited in speed which is generally at maximum 45 m/min in web or 3'000 sheets/hour in a sheet-fed process.

Conversely, rotary screen presses are designed for continuous, high speed printing. The screens used on rotary screen presses are for instance thin metal cylinders that are usually obtained using the electroforming method described hereabove or made of woven steel threads. The open-ended cylinders are capped at both ends and fitted into blocks at the side of the press. During printing, the varnish is pumped into one end of the cylinder so that a fresh supply is constantly maintained. The squeegee is fixed inside the rotating screen and squeegee pressure is maintained and adjusted to allow a good and constant print quality. The advantage of rotary screen presses is the speed which can reach easily 150 m/min in web or 10'000 sheets/hour in a sheet-fed process.

Screen printing is further described for example in *The Printing Ink Manual*, R. H. Leach and R. J. Pierce, Springer Edition, 5$^{th}$ Edition, pages 58-62, in *Printing Technology*, J. M. Adams and P. A. Dolin, Delmar Thomson Learning, 5$^{th}$ Edition, pages 293-328 and in *Handbook of Print Media*, H. Kipphan, Springer, pages 409-422 and pages 498-499.

The hybrid UV-LED radiation curable protective varnish claimed and described herein is curable by exposure to UV light, preferably by exposure to one or more wavelengths of between about 365 nm and about 405 nm, more preferably by exposure to UV light at 365 nm and/or 385 nm and/or 395 nm, emitted by one or more UV-LED light sources. As well-known by the person skilled in the art, the hybrid UV-LED radiation curable protective varnish claimed and described herein is also suitable for curing using medium-pressure mercury lamps.

Another aspect according to the present invention relates to a process for coating a security document comprising a substrate and one or more security features applied on or inserted into a portion of the substrate, wherein said process comprises the following steps:
  i) applying, preferably by a printing method selected from flexography printing, inkjet printing, and screen printing, the hybrid UV-LED radiation curable protective varnish claimed and described herein on a surface of the substrate and/or a surface of the one or more security features of the security document so as to form a varnish layer; and
  ii) curing the varnish layer by exposure to UV light emitted by a UV-LED source so as to form a protective coating covering the surface of the substrate and/or the surface of the one or more security features of the security document.

Preferably, at least one of the one or more security features applied on or inserted into a portion of the substrate of the security document to be coated is a UV light excitable luminescent security feature i.e. a security feature that emits light in response to excitation by UV light, in particular to UV light having a wavelength of 254 nm or 366 nm.

Preferably, step ii) described herein consists of exposing the varnish layer to one or more wavelengths of between about 365 nm and about 405 nm emitted by one or more UV-LED sources so as to form a protective coating covering the surface of the substrate and/or the surface of the one or more security features of the security document. Typically, commercially available UV-LED sources use one or more wavelengths, such as for example 365 nm, 385 nm, 395 nm and 405 nm. Preferably, step ii) described herein consists of exposing the varnish layer to a single wavelength between 365 nm and 405 nm, such as for example 365 nm, 385 nm, 395 nm or 405 nm, emitted by a UV-LED source so as to form a protective coating covering the surface of the substrate and/or the surface of the one or more security features of the security document. The varnish layer is preferably exposed to UV light at a dose of at least 150 mJ/cm$^2$, more preferably at a dose of at least 200 mJ/cm$^2$, and especially preferably at a dose of at least 220 mJ/cm$^2$ so as to cure the varnish layer and to form a protective coating covering the surface of the substrate and/or the surface of the one or more security features of the security document. As described hereafter, the dose may be measured using a UV Power Puck® II radiometer from EIT, Inc., U.S.A.

As used herein, the term "substrate" includes any security document substrate into a portion of which a security feature can be inserted and/or to which a security feature can be applied. Security document substrates include without limitation, papers or other fibrous materials such as cellulose, paper-containing materials, plastics and polymers, composite materials and mixtures or combinations thereof. Typical paper, paper-like or other fibrous materials are made from a variety of fibers including without limitation abaca, cotton, linen, wood pulp, and blends thereof. As well known to those skilled in the art, cotton and cotton/linen blends are preferred for banknotes, while wood pulp is commonly used in non-banknote security documents. Typical examples of plastics and polymers include polyolefins, such as polyethylene (PE) and polypropylene (PP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Typical examples of composite materials include without limitation multilayer structures or laminates of paper and at least one plastic or polymer material, such as those described hereabove. The substrate of the security document may be printed with any desired signs, including any symbols, images and patterns, and/or may include one or more security features, including luminescent security features.

A further aspect according to the present invention is directed to a security document comprising a substrate, one or more security features applied on or inserted into a portion of the substrate and a protective coating covering a surface of the substrate and/or a surface of the one or more security features of the security document, wherein the protective coating is obtained by the coating process claimed and described herein comprising the following steps:
  i) applying, preferably by a printing method selected from flexography printing, inkjet printing, and screen printing, more preferably by flexography printing, the hybrid UV-LED radiation curable protective varnish claimed and described herein on a surface of the substrate and/or a surface of the one or more security features of the security document so as to form a varnish layer; and
  ii) curing the varnish layer by exposure to UV light emitted by a UV-LED source so as to form a protective coating covering the surface of the substrate and/or the surface of the one or more security features of the security document.

The security document according to the present invention may comprise on one of its sides a protective coating-free region of between about 5 and about 15% of the substrate surface, wherein the percentages are based on the total surface of the security document. Preferably, said protective coating-free region is present on at least one edge or corner of the substrate. The protective coating-free region may be used for example for numbering the security document. If the security document is a banknote, the coating-free region may be additionally used for adsorbing a staining (indelible) ink used for protecting banknotes against theft and robbery as described in the international patent application publication no. WO2013127715A2.

A further aspect according to the present invention is directed to a protective coating for a security document comprising a substrate, and one or more security features applied on or inserted into a portion of the substrate, wherein the protective coating is obtained from the hybrid UV-LED radiation curable protective varnish claimed and described herein. Specifically, the above-mentioned protective coating is obtained by:
i) applying, preferably by a printing method selected from flexography printing, inkjet printing, and screen printing, more preferably by flexography printing, the hybrid UV-LED radiation curable protective varnish claimed and described herein on a surface of the substrate and/or a surface of the one or more security features of the security document so as to form a varnish layer; and
ii) curing the varnish layer by exposure to UV light emitted by a UV-LED source so as to form a protective coating covering the surface of the substrate and/or the surface of the one or more security features of the security document.

Preferably, at least one of the one or more security features applied on or inserted into a portion of the substrate of the security document to be coated is a UV light excitable luminescent security feature i.e. a security feature that emits light in response to excitation by UV light, in particular to UV light having a wavelength of 254 nm or 366 nm.

As used herein, the term "security document" refers to a document having a value such as to render it potentially liable to attempts at counterfeiting or illegal reproduction and which is usually protected against counterfeit or fraud by at least one security feature. Typical examples of security documents include without limitation banknotes, deeds, tickets, checks, vouchers, fiscal stamps and tax labels, agreements and the like, identity documents such as passports, identity cards, visas, bank cards, credit cards, transaction cards, access documents, entrance tickets and the like.

EXAMPLES

The present invention is now described in more details with reference to non-limiting examples. The examples and comparative examples below provide more details for the preparation of the hybrid UV-LED radiation curable protective varnishes according to the invention.

Photosensitizers

TABLE 1A

| Commercial Name (Supplier) | Structure, CAS Nr, and molecular weight |
|---|---|
| S1 Genopol* TX-2 (Rahn) | 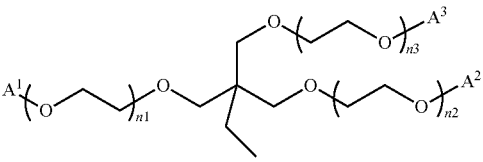 with 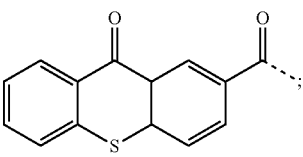 and/or 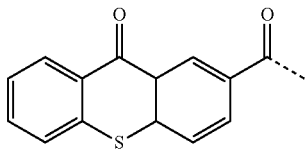 and/or 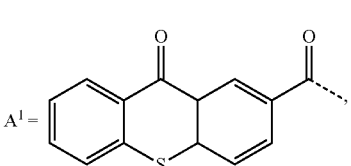 and |

TABLE 1A-continued
| Commercial Name (Supplier) | Structure, CAS Nr, and molecular weight |
|---|---|
| | $A^2 = A^3$ = hydrogen; and the sum n1 + n2 + n3 being from 3 to 12. CAS Nr: 2055335-46 918 ± 12 g/mol eq. PS |
| S2 Speedcure 7010 (Lambson) | 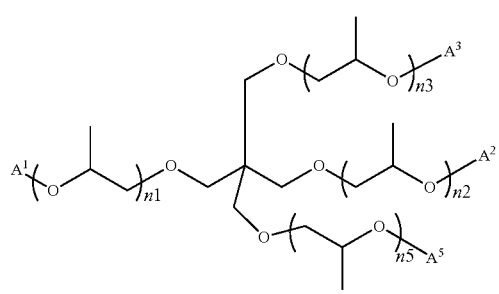 with 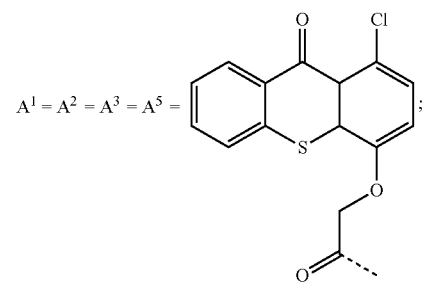 and/or 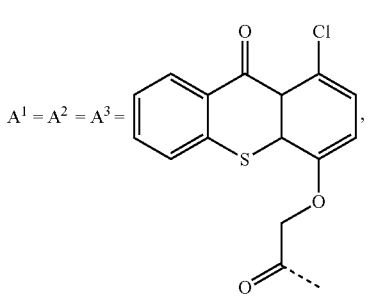 and $A^5$ = hydrogen; and/or 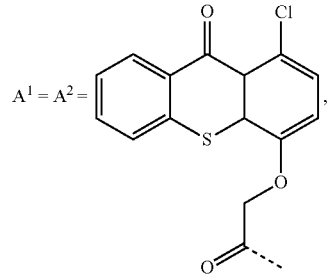 and $A^3 = A^5$ = hydrogen; and/or |

TABLE 1A-continued
| Commercial Name (Supplier) | Structure, CAS Nr, and molecular weight |
|---|---|
| | 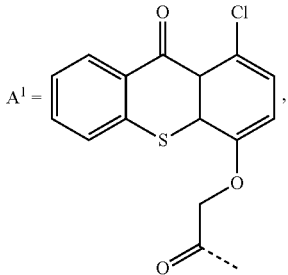<br>and<br>$A^2 = A^3 = A^5$ = hydrogen;<br>and<br>the sum n1 + n2 + n3 + n5 being from 3 to 12.<br>CAS Nr: 1003567-83-6<br>1297 ± 22 g/mol eq. PS |
| S3  OMNIPOL TX (IGM Resins) | 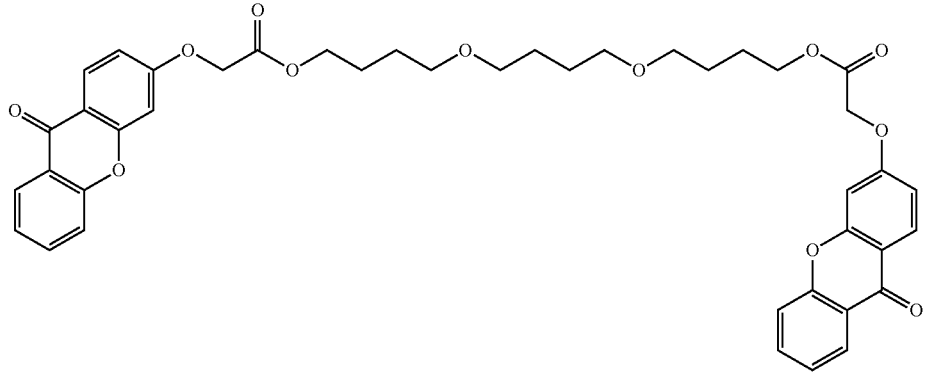 [SMILES: O=C(COc1ccc2c(=O)c3ccccc3oc2c1)OCCCCOCCCCOCCCCOC(=O)COc1ccc2c(=O)c3ccccc3oc2c1]<br>CAS Nr: 813452-37-8<br>761 ± 17 g/mol eq. PS |
| S4  Genocure* ITX (Rahn) | 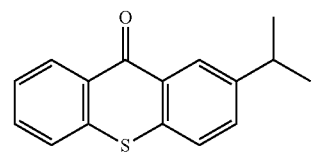 [SMILES: CC(C)c1ccc2sc3ccccc3c(=O)c2c1]<br>CAS Nr: 5495-84-1<br>254.35 [g/mol] [a] |
| S5  Speedcure CPTX (Lambson) | 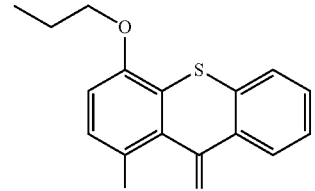<br>CAS Nr : 142770-42-1<br>304.79 [g/mol] [a] |

TABLE 1A-continued

| Commercial Name (Supplier) | Structure, CAS Nr, and molecular weight |
|---|---|
| S6  Genocure* DETX (Rahn) | 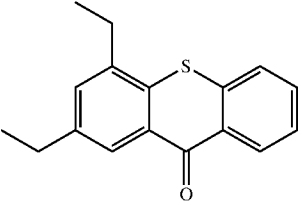 [SMILES: CCc1cc(CC)c2sc3ccccc3c(=O)c2c1]<br>CAS Nr: 82799-44-8<br>268.37 [g/mol] [a] |
| S7  Thioxanthone (Sigma-Aldrich) | 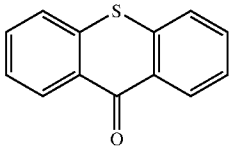 [SMILES: O=c1c2ccccc2sc2ccccc12]<br>CAS Nr: 492-22-8<br>212.27 [g/mol] [a] |
| S8  2-chloro-thioxanthone (Sigma-Aldrich) | 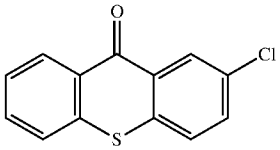 [SMILES: O=c1c2ccccc2sc2ccc(Cl)cc12]<br>CAS Nr: 86-39-5<br>246.71 [g/mol] [a] |
| S9  Anthracure ® UVS-1331 (Kawasaki Kasei) | 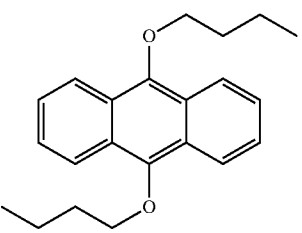 [SMILES: CCCCOc1c2ccccc2c(OCCCC)c2ccccc12]<br>CAS Nr : 76275-14-4<br>322.45 [g/mol] [a] |

[a] the molecular weight was calculated with ChemDraw Professional (version 20.0.0.41).

Weight Average Molecular Weight Measurement

The weight average molecular weight of the oligomeric photosensitizers S1-S3 was independently determined by GPC (gel permeation chromatography) according to the method described below (based on the OECD test method 118):

A Malvern Viskotek GPCmax was used. The device was equipped with an isocratic pump, a degasser, an autosampler and a triple detector TDA 302 comprising a differential refractometer, a viscosimeter and a double-angle light scattering detector (7° and 90°). For this specific measurement, only the differential refractometer was used. A calibration curve (log(molecular mass)=f(retention volume)) was established using six polystyrene standards (with molecular masses ranging from 472 to 512000 g/mol). Two columns Viskotek TM4008L (column length 30.0 cm, internal diameter 8.0 mm) were coupled in series. The stationary phase was made of a styrene-divinylbenzene copolymer with a particle size of 6 µm and a maximum pore size of 3000 Å.

During the measurement, the temperature was fixed at 35° C. The analyzed samples contained 10 mg/mL of the investigated compounds dissolved in THF (Acros, 99.9%, anhydrous) and were injected at a rate of 1 mL/min. The molecular mass of the compounds was calculated from the chromatogram as a polystyrene-equivalent weight average molecular weight (PS eq $M_w$), with a 95% confidence level and the average of three measurements of the same solution, using the following formula:

$$M_w = \frac{\sum_{i=1}^{n} H_i M_i}{\sum_{i=1}^{n} H_i}$$

where $H_i$ is the level of the detector signal from the baseline for the retention volume $V_i$, $M_i$ is the molecular weight of the compound fraction at the retention volume $V_i$ and n is number of data points. Omnisec 5.12 as provided with the device was used as a software. The PS eq $M_w$ measured for S1, S2 and S3 are indicated in Table 1A hereabove.

Sulfur Molar Concentration in the Thioxanthone-Based Photosensitizers S1-S8

The sulfur molar concentration (mmol sulfur/g photosensitizer) corresponds to the molar concentration of the reactive thioxanthone-based moiety (mmol reactive thioxanthone-based moiety/g photosensitizer) and is used to ensure that all thioxanthone-based photosensitizers are used at equivalent molar concentration of the reactive thioxanthone-based moiety. The sulfur molar concentration was obtained either by ED-XRF measurement of the sulfur atom (photosensitizers S1-S3) or by direct determination using the molecular weight of the known structure (photosensitizers S4-S8) as calculated with ChemDraw Professional (version 20.0.0.41).

Determination of the Sulfur Molar Concentration in the Oligomeric Photosensitizers S1-S3 by ED-XRF The sulfur molar concentration in the oligomeric photosensitizers S1-S3 was determined by ED-XRF (Spectro XEPOS) using the internal standard addition technique and the sulfur atom signal. For each of the oligomeric photosensitizers S1-S3 of Table 1A, three 50 mL solutions at 2 mg/mL of the corresponding photosensitizer in acetonitrile (Sigma-Aldrich, 99.9%) were prepared. From each solution, 5 mL samples were collected and increasing amounts of a 5 mg/mL solution of Genocure ITX (Rahn, 99.3% according to certificate of analysis) in acetonitrile were added. Each sample was completed to 10 mL with acetonitrile. The following solutions have been obtained and are provided in Table 1B.

TABLE 1B

| Level | Solution S1-S2 [mL] | Solution ITX [mL] | Acetonitrile [mL] |
|---|---|---|---|
| 0 | 5 | 0 | 5 |
| 1 | 5 | 1 | 4 |
| 2 | 5 | 3 | 2 |
| 3 | 5 | 4 | 1 |

Each sample was independently submitted to an ED-XRF measurement (Spectro XEPOS) and a spectrum was recorded. A blank measurement (pure acetonitrile) was deduced from all spectra. For each series of samples (triplicate measurement), the measured fluorescence intensity at 2.31 keV (S Kα1 peak) was displayed as a function of the molar concentration (mmol/ml) of the sulfur contained by the added Genocure ITX and a linear regression was performed. The absolute value of the x-intercept of the regression line indicated the sulfur molar concentration present at level 0 in each sample. Average values (average of three measurements) are provided in Table 1C. The corresponding average value was used to determine the sulfur molar concentration in each of the oligomeric photosensitizers S1-S3 (mmol sulfur/g photosensitizer) and to calculate the amount (wt-%) of oligomeric photosensitizers S1-S3 to be added for the preparation of the examples and comparative examples.

Table 1C summarizes the determined (photosensitizers S1-S3) and calculated (photosensitizers S4-S8) sulfur molar concentration (mmol sulfur/g photosensitizer) corresponding to the molar concentration of the reactive thioxanthone-based moiety (mmol reactive thioxanthone-based moiety/g photosensitizer).

TABLE 1C

| Photosensitizer | Reactive thioxanthone-based moiety | Sulfur molar concentration (mmol sulfur/g photosensitizer) | Concentration reactive thioxanthone-based moiety (mmol reactive thioxanthone-based moiety/g photosensitizer) |
|---|---|---|---|
| S1 | 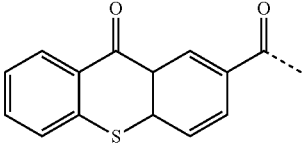<br>2-keto-thioxanthone moiety | 1.70 | 1.70 |
| S2 | 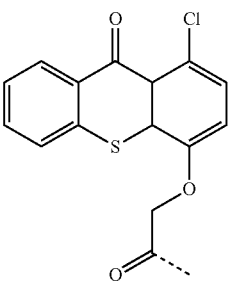<br>1-chloro-4-carboxymethoxy-thioxanthone moiety | 2.07 | 2.07 |

TABLE 1C-continued
| Photosensitizer | Reactive thioxanthone-based moiety | Sulfur molar concentration (mmol sulfur/g photosensitizer) | Concentration reactive thioxanthone-based moiety (mmol reactive thioxanthone-based moiety/g photosensitizer) |
|---|---|---|---|
| S3 | 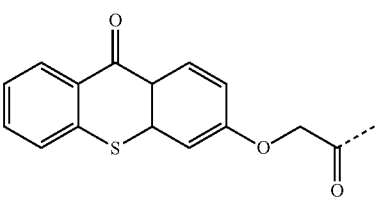 | 2.40 | 2.40 |
| S4 | 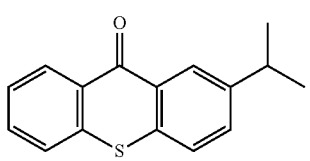 | 3.93 | 3.93 |
| S5 | 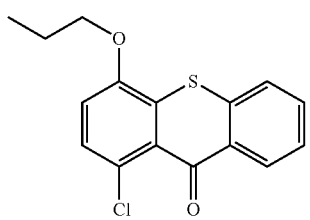 [SMILES: CCCOc1ccc(Cl)c2c(=O)c3ccccc3sc12] | 3.28 | 3.28 |
| S6 | 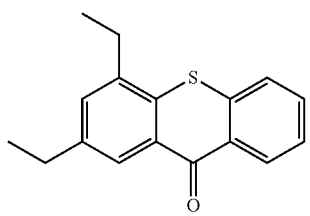 [SMILES: CCc1cc(CC)c2sc3ccccc3c(=O)c2c1] | 3.73 | 3.73 |
| S7 | 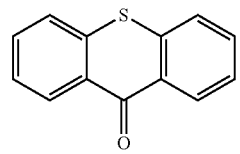 [SMILES: O=c1c2ccccc2sc2ccccc12] | 4.71 | 4.71 |
| S8 | 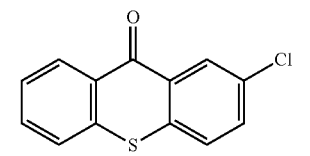 [SMILES: O=c1c2ccccc2sc2ccc(Cl)cc12] | 4.05 | 4.05 |

Cationic Photoinitiators
TABLE 1D
| Commercial Name (Supplier) | Structure, chemical name and CAS Nr |
|---|---|
| CP1 Omnicat 440 (IGM Resins) | 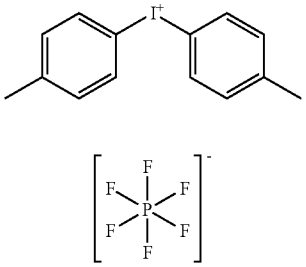 4,4'-dimethyl-diphenyl iodonium hexafluorophosphate (CAS Nr: 60565-88-0) |
| CP2 Speedcure 938 (Lambson) | 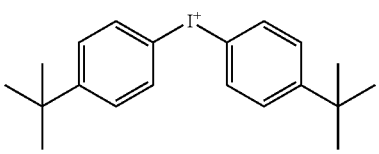 [SMILES: CC(C)(C)c1ccc([I+]c2ccc(C(C)(C)C)cc2)cc1] bis(4-tert-butylphenyl)iodonium hexafluorophosphate (CAS Nr: 61358-25-6) |
| CP3 Speedcure 992 (Lambson) | 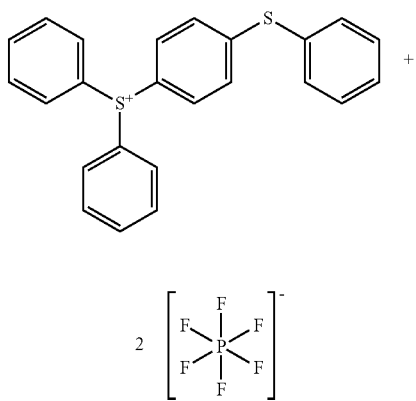 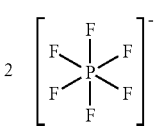 |

TABLE 1D-continued

| Commercial Name (Supplier) | Structure, chemical name and CAS Nr |
|---|---|
|  | 50 wt-% propylene carbonate (CAS Nr: 108-32-7) + 50 wt-% mixture of sulfonium, diphenyl[(phenylthio)phenyl]-, hexafluorophosphate(1-) (1:1) (CAS Nr: 68156-13-8) and sulfonium, S,S'-(thiodi-4,1-phenylene)bis[S,S-diphenyl-, hexafluorophosphate(1-) (1:2) (CAS Nr: 74227-35-3) |

Free Radical Photoinitiators

TABLE 1E

| | Commercial Name (Supplier) | Structure, Chemical name CAS Nr, and molecular weight [g/mol] [a] |
|---|---|---|
| RP1 | Omnirad 2959 (IGM Resins) | 2-hydroxy-4'-hydroxyethoxy-2-methylpropiophenone (CAS Nr: 106797-53-9) 224.25 |
| RP2 | Omnirad 184 (IGM Resins) | 1-hydroxycyclohexyl phenyl ketone (CAS Nr: 947-19-3) 204.26 |
| RP3 | Genocure MBF (Rahn) | methyl benzoylformate (CAS Nr: 15206-55-0) 164.16 |
| RP4 | Genocure BDK (Rahn) | 2,2-dimethoxy-1,2-diphenylethan-1-one (CAS Nr: 24650-42-8) 256.30 |

[a] The molecular weight of the free radical photoinitiators RP1-RP4 was obtained from SciFinder Other Ingredients

TABLE 1F

| Ingredient | Commercial name (supplier) | Chemical name and CAS Nr. |
|---|---|---|
| Cycloaliphatic epoxide | Uvacure 1500 (Allnex) | 7-oxabicyclo[4.1.0]hept-3-ylmethyl 7-oxabicyclo[4.1.0]heptane-3-carboxylate (CAS Nr: 2386-87-0) |
| Oxetane | Curalite ™Ox (Perstorp) | 3-ethyloxetane-3-methanol (CAS Nr: 3047-32-3) |
| Radical oligomer | Ebecryl 2959 (Allnex) | 23% glycerol propoxylated triacrylate (CAS Nr: 52408-84-1) + 77% bisphenol-A epoxy acrylate oligomer (CAS Nr: 55818-57-0) |
| Antifoam agent | TEGO ® AIREX 900 (Evonik) | Siloxanes and Silicones, di-Me, reaction products with silica (CAS Nr: 67762-90-7) |
| Surfactant | BYK ®-330 (BYK) | 50% active ingredient (polyether modified polydimethylsiloxane; CAS Nr: not available) + 50% 2-methoxy-1-methylethyl acetate CAS Nr: 108-65-6) |
| Matting agent | ACEMATT ® TS 100 (Evonik) | Silica, amorphous, fumed, crystal-free (CAS Nr: 112945-52-5) |
| Solvent | n-butanol (BRENNTAG) | Butan-1-ol (CAS Nr: 71-36-3) |

Preparation of the Hybrid UV-LED Radiation Curable Protective Varnishes E1-E10 According to the Present Invention, Comparative Hybrid Varnishes, C1-C5, C6a-C11a, C6b-C11b and C12, and Protective Coatings Obtained Thereof A1. Preparation of Hybrid UV-LED Radiation Curable Protective Varnishes (E1-E3) According to the Invention and Comparative Varnishes (C1-C2)

100 g of each of the hybrid UV-LED radiation curable protective varnishes according to the invention (E1-E3) and the comparative varnishes C1-C2 were prepared by first pre-mixing the three first ingredients (cycloaliphatic epoxide, oxetane and radical oligomer) of Table 2A using a Dispermat (model CV-3) (5 min at 1500 rpm), then adding and dispersing the matting agent during about 25 minutes at 1500 rpm and finally adding the other ingredients and mixing further the so-obtained mixture during about 15 minutes at 1500 rpm. The hybrid UV-LED radiation curable protective varnishes E1-E3 and the comparative varnishes C1-C2 have viscosity properties that render them suitable for flexography printing and screen printing.

TABLE 2A

Composition of the hybrid UV-LED radiation curable protective varnishes E1-E3 and comparative varnishes C1-C2

| Ingredient | Commercial name | C1 | E1 | E2 | E3 | C2 |
|---|---|---|---|---|---|---|
| Cycloaliphatic epoxide | Uvacure 1500 | 66.62 | 66.30 | 66.30 | 65.98 | 65.66 |
| Oxetane | Curalite ™Ox | | | 12.60 | | |
| Radical oligomer | Ebecryl 2959 | | | 8.00 | | |
| Antifoam agent | TEGO ® AIREX 900 | | | 0.30 | | |
| Surfactant | BYK ®-330 | | | 0.50 | | |
| Matting agent | ACEMATT ® TS 100 | | | 3.50 | | |
| Solvent | n-butanol | | | 4.00 | | |
| Diaryliodonium salt | Omnicat 440 (CP1) | 2.50 | 2.50 | | 2.50 | 2.50 |
| | Speedcure 938 (CP2) | | | 2.50 | | |
| Free radical photoinitiator | Omnirad 2959 (RP1) | | | 1.50 | | |
| Photosensitizer | Speedcure 7010 (S2) | 0.48 | 0.80 | 0.80 | 1.12 | 1.44 |
| Concentration reactive thioxanthone-based moiety [mmol/100 g] [a] | | 0.99 | 1.66 | 1.66 | 2.31 | 2.98 |

[a] Concentration of the reactive thioxanthone-based moiety (1-chloro-4-carboxymethoxy-thioxanthone moiety) in the varnish (mmol reactive thioxanthone-based moiety (1-chloro-4-carboxymethoxy-thioxanthone moiety) / 100 g varnish).

A2. Preparation of Protective Coatings

The protective varnishes E1-E3 according to the invention and the comparative varnishes C1-C2 were independently applied by hand on a piece of fiduciary polymer substrate (Guardian™ by CCL Secure) using a hand-coater unit with a n° 0 bar (RK-print) to furnish a varnish layer having a size of approximately 5 cm×10 cm and a thickness of about 4 μm. Subsequently, each of the varnish layers was cured, under controlled relative humidity, by exposing said varnish layer two times at a speed of 150 m/min to UV light under a UV-LED curing unit LUV20 emitting at 385 nm from IST Metz GmbH (100% lamp power with a 70% duty cycle and a nominal lamp-to-sample distance of 20 mm leading to an approximate total delivered dose of 220 mJ/cm². The dose was measured by passing a Powerpuck II apparatus under the UV-LED in similar conditions to the cured samples (same speed and same distance between lamp and sample/detector). The doses are given for a UV-A2 range, selected by a specific filter in the apparatus (370-415 nm). The conditions used for curing the coated substrates are similar to the curing conditions expected in an industrial environment.

A3. Assessment of the Curing Performance of the Hybrid UV-LED Radiation Curable Varnishes E1-E3 and Comparative Varnishes C1-C2 Using the MEK Rub Test The protective coatings obtained as described at item A2 above were stored in the dark for 24 hours. After that period, the deep cure performance of each protective coating, which is indicative of the curing properties of the varnish used for obtaining said protective varnish, was assessed by the following procedure:

a cotton swab was dipped in methyl ethyl ketone (MEK) 99.5% (Brenntag);
each protective coating was rubbed 50 times with the cotton swab, on an area of approx. 0.5 cm by 5 cm, using a gentle pressure of the hand and after 30 seconds, the rubbed area was visually assessed. The results of the visual assessment summarized in Table 2B were classified as follows:

"poor": the MEK rub test results in the partial or total removal of the protective varnish, which indicates that the curing of the protective coating is insufficient, and the varnish presents poor curing properties, "acceptable": the MEK rub test is visually detectable, there is no removal of the protective coating, which indicates that the curing of the protective coating is acceptable, and the varnish presents acceptable curing properties, "optimal": the MEK rub test is not visually detectable, which indicates that the curing of the protective coating is optimal, and the varnish presents optimal curing properties. Varnishes with acceptable and optimal curing properties under the herein described curing conditions are suitable to be used for the industrial production of protective coatings for security documents.

TABLE 2B

Results of the MEK rub test

| Varnish | C1 | E1 | E2 | E3 | C2 |
|---|---|---|---|---|---|
| Relative humidity [% rH] | 45 | 45 | 47 | 45 | 45 |
| Curing [a] | poor | optimal | optimal | optimal | optimal |

[a] curing as determined by the MEK rub test after 24 h.

A4. Evaluation of the Fluorescence Exhibited by the Protective Coatings Having Optimal Curing Properties (Varnishes E1-E3 and Comparative Varnish C2) as Determined by the MEK Rub Test The fluorescence exhibited by the protective coatings obtained from varnishes having optimal curing properties as determined by the MEK rub test i.e. the protective coatings obtained from the varnishes E1-E3 according to the invention and the comparative varnish C2 was assessed using the method described hereafter. Table 2C presents the fluorescence results.

The residual fluorescence of the protective coatings was assessed using a Fluorolog II (Spex) device at 254 nm and 366 nm, using the following parameters:
Detector: R928/0115/0381
Angle: 30°
Position: front face
Excitation slit: 2 nm (254 nm) and 2 nm (366 nm)
Integration time: 0.1 sec
Covered wavelength: 400-700 nm (increment 1 nm)
Detection slit: 1 nm (254 nm) and 1 nm (366 nm), UV-filter (400 nm and below) to avoid detection of excitation light From the obtained spectrum, the intensity maximum of fluorescence was determined, and the obtained value was reported as an absolute value in photons/sec., as shown in Table 2D.

The absolute intensity at maximum fluorescence (in photons/sec.) measured for each protective coating obtained from the hybrid UV-LED radiation curable protective varnishes E1-E3 according to the present invention and the comparable varnish C2 was compared to the absolute intensity at maximum fluorescence of comparison standards (ST1-ST2). Said comparison standards were prepared with a hybrid varnish for curing under standard mercury lamps, with compounds that are considered by skilled people as exhibiting low intrinsic fluorescence and/or able to generate only a minimal amount of fluorescent degradation products upon curing. The comparison standards ST1 and ST2 were prepared at the same time as the protective coatings for which they serve as comparison standard. The residual fluorescence of the comparison standards (ST1-ST2) was measured at the same time as the residual fluorescence of the protective coating for which they serve as comparison standard.

TABLE 2C composition of the standard hybrid protective varnish that is UV-Vis curable with Hg lamps (used to produce the comparison standards ST1-ST2)

| Ingredient | Commercial name | [wt-%] |
|---|---|---|
| Cycloaliphatic epoxide | Uvacure ® 1500 | 64.20 |
| Oxetane | Curalite ™Ox | 12.60 |
| Radical oligomer | Ebecryl 2959 | 8.00 |
| Antifoam agent | TEGO ® AIREX 900 (Evonik) | 0.30 |
| Surfactant | BYK ®-330 | 0.50 |
| Matting agent | ACEMATT ® TS 100 | 3.50 |
| Solvent | n-butanol | 4.00 |
| Cationic photoinitiator | Speedcure 992 | 5.40 |
| Radical photoinitiator | Speedcure 2959 | 1.50 |

The standard hybrid protective varnish described in Table 2C was applied to a piece of fiduciary polymer substrate (Guardian™ by CCL Secure) using a hand-coater unit with a n° 0 bar (RK-print) to form a varnish layer having a size of approximately 5 cm×10 cm and a thickness of about 4 μm. The varnish layer was cured at controlled relative humidity by exposing said varnish layer two times at a speed of 100 m/min to UV-Vis light under a mercury lamp unit (IST Metz GmbH; two lamps: iron-doped mercury lamp+mercury lamp), generating the comparison standards ST1-ST2.

After storage in the dark for 24 h, the curing of each independent comparison standard ST1-ST2 was evaluated using the MEK rub test described at item A3 above. The comparison standards ST1-ST2 showed an optimal curing.

Table 2D displays the absolute intensity at maximum fluorescence of the protective coatings obtained from the varnishes E1-E3 and the comparative varnish C2 and the absolute intensity at maximum fluorescence (in photons/sec.) of the corresponding comparison standards (ST1-ST2), as well as the ratio between the absolute intensity at maximum fluorescence of each of the protective coatings and the absolute intensity at maximum fluorescence of the corresponding comparison standard ST1-ST2 (relative fluorescence value).

TABLE 2D

Results of the fluorescence measurements

| Varnish | | E1 | E2 | E3 | C2 |
|---|---|---|---|---|---|
| Comparison standard | | ST1 | ST2 | ST1 | ST1 |
| Fluorescence @366 nm [photons/sec] | Comparison standard | 3.1E+05 | 3.7E+05 | 3.1E+05 | 3.1E+05 |
| | Protective coating | 3.5E+05 | 3.8E+05 | 4.5E+05 | 5.3E+05 |
| Relative fluorescence value | | 1.1 | 1.0 | 1.5 | 1.7 |
| Fluorescence @254 nm [photons/sec] | Comparison standard | 3.0E+05 | 2.9E+05 | 3.0E+05 | 3.0E+05 |
| | Protective coating | 4E+05 | 3.7E+05 | 4.9E+05 | 5.5E+05 |
| Relative fluorescence value | | 1.4 | 1.3 | 1.6 | 1.8 |

The fluorescence of the protective coatings obtained from the hybrid UV-LED radiation curable protective varnishes E1-E3 according to the present invention and the comparative varnish C2 was also visually assessed using a CAMAG UV Cabinet 4 (equipped with two UV tubes at 254 nm and 366 nm, 8 W each). The visual perception was correlated with the measured relative fluorescence value determined as described above. Table 2E summarizes the correlations between the visual perception and the measured relative fluorescence value.

TABLE 2E

| Relative fluorescence value at 254/366 nm | Visual perception |
|---|---|
| <1.3 | Low fluorescence, close to comparison standard |
| 1.3-1.6 | Acceptable fluorescence |
| >1.6 | Too high fluorescence |

Protective varnishes are usually applied on the whole surface and on both sides of the security document. Hence, protective coatings exhibiting a relative fluorescence higher than 1.6 (compared to the comparison standards ST1-ST2) tend to make the visual observation and/or machine readability of luminescent security features present in said security document difficult or even impossible.

As shown by the experiments conducted with the protective varnishes E1-E3 according to the present invention, hybrid UV-LED radiation curable protective varnishes comprising a photosensitizer of general formula (I) and a concentration of 1-chloro-4-carboxymethoxy-thioxanthone moiety from about 1.3 mmol to about 2.6 mmol per 100 g of protective varnish, exhibit both an optimal curing performance and a low to acceptable fluorescence both at 254 and 366 nm. Hybrid UV-LED radiation curable protective varnishes comprising a photosensitizer of general formula (I) and a concentration of 1-chloro-4-carboxymethoxy-thioxanthone moiety lower than about 1.3 mmol per 100 g of protective varnish, such as comparative varnish C1, show a poor curing performance. Hybrid UV-LED radiation curable protective varnishes comprising a photosensitizer of general formula (I) and a concentration of 1-chloro-4-carboxymethoxy-thioxanthone moiety higher than 2.6 mmol per 100 g of protective varnish, such as comparative varnish C2, have a good curing performance, but yield protective coatings exhibiting a too high fluorescence, which is not acceptable for protective varnishes for security documents.

B1. Preparation of Hybrid UV-LED Radiation Curable Protective Varnishes E4-E7 According to the Present Invention and Comparative Varnishes C3-C5

100 g of each of the hybrid UV-LED radiation curable protective varnishes according to the invention (E4-E7) and the comparative varnishes C3-C5 were prepared in the same way as described under item A1 for the varnishes E1-E3 and the comparative varnishes C1-C2, using the ingredients shown in Table 3A. The hybrid UV-LED radiation curable protective varnishes E4-E7 and the comparative varnishes C3-C5 have viscosity properties that render them suitable for flexography printing and screen printing.

TABLE 3A

Composition of the hybrid UV-LED radiation curable protective varnishes E4-E7 and comparative varnishes C3-C5

| Ingredient | Commercial name | C3 | E4 | E5 | E6 | E7 | C4 | C5 |
|---|---|---|---|---|---|---|---|---|
| Cycloaliphatic epoxide | Uvacure 1500 | 66.52 | 66.13 | 66.13 | 65.75 | 65.36 | 65.10 | 64.60 |
| Oxetane | Curalite ™Ox | | | | 12.60 | | | |
| Radical oligomer | Ebecryl 2959 | | | | 8.00 | | | |
| Antifoam agent | TEGO ® AIREX 900 | | | | 0.30 | | | |
| Surfactant | BYK ®-330 | | | | 0.50 | | | |
| Matting agent | ACEMATT ® TS 100 | | | | 3.50 | | | |
| Solvent | n-butanol | 4.00 | | | | | | |
| Diaryliodonium salt | Omnicat 440 (CP1) | 2.50 | 2.50 | | 2.50 | 2.50 | 2.50 | 2.50 |
| | Speedcure 938 (CP2) | | | 2.50 | | | | |
| Free radical photoinitiator | Omnirad 2959 (RP1) | | | | 1.50 | | | |
| Photosensitizer | Genopol TX-2 (S1) | 0.58 | 0.97 | 0.97 | 1.35 | 1.74 | 2.00 | 2.50 |
| Concentration reactive thioxanthone-based moiety [mmol/100 g] [a] | | 0.99 | 1.65 | 1.65 | 2.30 | 2.96 | 3.40 | 4.25 |

[a] Concentration of the reactive thioxanthone-based moiety (2-keto-thioxanthone moiety) in the varnish (mmol reactive thioxanthone-based (2-keto-thioxanthone) moiety / 100 g varnish)

B2. Preparation of Protective Coatings

Protective coatings were prepared from the hybrid LED-UV curable protective varnishes E4-E7 according to the invention and comparative varnishes C3-C5 in the same way as described under item A2.

B3. Assessment of the Curing Performance of the Hybrid UV-LED Radiation Curable Varnishes E4-E7 and Comparative Varnishes C3-C5 Using the MEK Rub Test The protective coatings obtained as described at item B2 above were stored in the dark for 24 hours. After that period, the deep cure performance of each protective coating, which is indicative of the curing properties of the varnish used for obtaining said protective varnish, was assessed as described under item A3 above. The results of the test are displayed in Table 3B.

TABLE 3B

| Results of the MEK rub test | | | | | | | |
|---|---|---|---|---|---|---|---|
| Varnish | C3 | E4 | E5 | E6 | E7 | C4 | C5 |
| Relative humidity [% rH] | 45 | 45 | 47 | 45 | 45 | 45 | 45 |
| Curing [a] | poor | acceptable | optimal | optimal | optimal | optimal | optimal |

[a] curing as determined by the MEK rub test after 24 h.

B4. Evaluation of the Fluorescence Exhibited by the Protective Coatings Having Acceptable/Optimal Curing Properties (Varnishes E4-E7 According to the Invention and Comparative Varnishes C4-C5) as Determined by the MEK Rub Test The fluorescence exhibited by the protective coatings obtained from varnishes having acceptable to optimal curing properties as determined by the MEK rub test i.e. the protective coatings obtained from the varnishes E4-E7 according to the invention and the comparative varnishes C4-C5 was assessed using the method described under item A4 above. Table 3C presents the fluorescence results.

The comparison standards ST1 and ST2 were prepared as described under item A4, using the composition described in Table 2C, at the same time as the protective coatings for which they serve as comparison standard. The residual fluorescence of the comparison standards (ST1-ST2) was measured at the same time as the residual fluorescence of the protective coating for which they serve as comparison standard.

TABLE 3C

| Results of the fluorescence measurements | | | | | | | |
|---|---|---|---|---|---|---|---|
| Varnish | | E4 | E5 | E6 | E7 | C4 | C5 |
| Comparison standard | | ST1 | ST2 | ST1 | ST1 | ST1 | ST1 |
| Fluorescence @366 nm [photons/sec] | Comparison standard | 3.1E+05 | 3.7E+05 | 3.1E+05 | 3.1E+05 | 3.1E+05 | 3.1E+05 |
| | Protective coating | 3.1E+05 | 3.3E+05 | 3.8E+05 | 4.9E+05 | 5.7E+05 | 6.7E+05 |
| Relative fluorescence value | | 1.0 | 0.9 | 1.2 | 1.6 | 1.9 | 2.2 |
| Fluorescence @254 nm [photons/sec] | Comparison standard | 3.0E+05 | 2.9E+05 | 3.0E+05 | 3.0E+05 | 3.0E+05 | 3.0E+05 |
| | Protective coating | 2.6E+05 | 2.4E+05 | 3.2E+05 | 4.3E+05 | 4.8E+05 | 5.1E+05 |
| Relative fluorescence value | | 0.9 | 0.8 | 1.1 | 1.4 | 1.6 | 1.7 |

The fluorescence of the protective coatings obtained from the comparative hybrid UV-LED radiation curable protective varnishes E4-E7 and the comparative varnishes C4-C5 was also visually assessed using a CAMAG UV Cabinet 4 (equipped with two UV tubes at 254 nm and 366 nm, 8 W each). The visual perception was correlated with the measured relative fluorescence value determined as described under item A4, Table 2E above.

Protective varnishes are usually applied on the whole surface and on both sides of the security document. Hence, protective coatings exhibiting a relative fluorescence higher than 1.6 (compared to the comparison standards ST1-ST2) tend to make the visual observation and/or machine readability of luminescent security features present in said security document difficult or even impossible.

As shown by the experiments conducted with the protective varnishes E4-E7 according to the present invention, hybrid UV-LED radiation curable protective varnishes comprising a photosensitizer of general formula (I) and a concentration of the 2-keto-thioxanthone moiety from about 1.3 mmol to about 3.2 mmol per 100 g of protective varnish, exhibit both an acceptable to optimal curing performance and a low to acceptable fluorescence both at 254 and 366 nm. Hybrid UV-LED radiation curable protective varnishes comprising a photosensitizer of general formula (I) and a concentration of 2-keto-thioxanthone moiety lower than about 1.3 mmol per 100 g of protective varnish, such as comparative varnish C3, show a poor curing performance. Hybrid UV-LED radiation curable protective varnishes comprising a photosensitizer of general formula (I) and a concentration of 2-keto-thioxanthone moiety higher than 3.2 mmol per 100 g of protective varnish, such as comparative varnish C4 and C5, have a good curing performance, but yield protective coatings exhibiting a too high fluorescence.

C1. Preparation of Hybrid UV-LED Radiation Curable Protective Varnishes E8-E10 According to the Invention 100 g of each of the hybrid UV-LED radiation curable protective varnishes according to the invention (E8-E10) were prepared in the same way as described under item A1 for the varnishes E1-E3 and the comparative varnishes C1-C2, using the ingredients shown in Table 4A. The hybrid UV-LED radiation curable protective varnishes E8-E10 contain an identical molar concentration of free radical photoinitiator (mmols free radical photoinitiator/100 g varnish) as the hybrid UV-LED radiation curable protective varnishes E4 and E5. The hybrid UV-LED radiation curable protective varnishes E8-E10 have viscosity properties that render them suitable for flexography printing and screen printing.

TABLE 4A

Composition of the hybrid UV-LED radiation curable protective varnishes E8-E10

| Ingredient | Commercial name | E8 | E9 | E10 |
|---|---|---|---|---|
| Cycloaliphatic epoxide | Uvacure 1500 | 66.26 | 66.53 | 65.92 |
| Oxetane | Curalite ™Ox | | 12.60 | |
| Radical oligomer | Ebecryl 2959 | | 8.00 | |
| Antifoam agent | TEGO ® AIREX 900 | | 0.30 | |
| Surfactant | BYK ®-330 | | 0.50 | |
| Matting agent | ACEMATT ® TS 100 | | 3.50 | |
| Solvent | n-butanol | | 4.00 | |
| Diaryliodonium salt | Omnicat 440 (CP1) | | 2.50 | |
| Free radical photoinitiator | Omnirad 184 (RP2) | 1.37 | | |
| | Genocure MBF (RP3) | | 1.10 | |
| | Genocure BDK (RP4) | | | 1.71 |

TABLE 4A-continued

Composition of the hybrid UV-LED radiation curable protective varnishes E8-E10

| Ingredient | Commercial name | E8 | E9 | E10 |
|---|---|---|---|---|
| Photosensitizer | Genopol TX-2 (S1) | 0.97 | 0.97 | 0.97 |
| Concentration reactive thioxanthone-based moiety [mmol/100 g] [a] | | 1.65 | 1.65 | 1.65 |

[a] Concentration of the reactive thioxanthone-based moiety (2-keto-thioxanthone) in the varnish (mmol reactive thioxanthone-based (2-keto-thioxanthone) moiety/100 g varnish)

C2. Preparation of Protective Coatings

Protective coatings were prepared from the hybrid LED-UV curable protective varnishes E8-E10 according to the invention in the same way as described under item A2.

C3. Assessment of the Curing Performance of the Hybrid UV-LED Radiation Curable Varnishes E8-E10 Using the MEK Rub Test The protective coatings obtained as described at item C2 above were stored in the dark for 24 hours. After that period, the deep cure performance of each protective coating, which is indicative of the curing properties of the varnish used for obtaining said protective varnish, was assessed as described under item A3 above. The results of the test are displayed in Table 4B.

TABLE 4B

Results of the MEK rub test

| Varnish | E8 | E9 | E10 |
|---|---|---|---|
| Relative humidity [% rH] | 45 | 45 | 45 |
| Curing [a] | optimal | acceptable | acceptable |

[a] curing as determined by the MEK rub test after 24 h.

C4. Evaluation of the Fluorescence Exhibited by the Protective Coatings Having Acceptable/Optimal Curing Properties (Varnishes E8-E10 as Determined by the MEK Rub Test)

The fluorescence exhibited by the protective coatings obtained from varnishes having acceptable/optimal curing properties as determined by the MEK rub test i.e. the protective coatings obtained from the varnishes E8-E10 was assessed using the method described under item A4 above. Table 4C presents the fluorescence results.

The comparison standard ST1 was prepared as described under item A4, using the composition described in Table 2C, at the same time as the protective coatings for which it serves as comparison standard.

The residual fluorescence of the comparison standard ST1 was measured at the same time as the residual fluorescence of the protective coating for which it serves as comparison standard.

TABLE 4C

Results of the fluorescence measurements

| Varnish | | E8 | E9 | E10 |
|---|---|---|---|---|
| Comparison standard | | ST1 | ST1 | ST1 |
| Fluorescence @366 nm [photons/sec] | Comparison standard | 3.1E+05 | 3.1E+05 | 3.1E+05 |
| | Protective coating | 3.0E+05 | 3.2E+05 | 3.0E+05 |
| Relative fluorescence value | | 1.0 | 1.0 | 1.0 |
| Fluorescence @254 nm [photons/sec] | Comparison standard | 3.0E+05 | 3.0E+05 | 3.0E+05 |
| | Protective coating | 2.7E+05 | 3.1E+05 | 2.4E+05 |
| Relative fluorescence value | | 0.9 | 1.1 | 0.8 |

The fluorescence of the protective coatings obtained from the hybrid UV-LED radiation curable protective varnishes E8-E10 was also visually assessed using a CAMAG UV Cabinet 4 (equipped with two UV tubes at 254 nm and 366 nm, 8 W each). The visual perception was correlated with the measured relative fluorescence value determined as described under item A4, Table 2E above. Protective varnishes are usually applied on the whole surface and on both sides of the security document. Hence, protective coatings exhibiting a relative fluorescence higher than 1.6 (compared to the comparison standard ST1) tend to make the visual observation and/or machine readability of luminescent security features present in said security document difficult or even impossible.

The curing and fluorescence properties of the coatings obtained with the protective varnishes E8-E10, E4 and E5 according to the present invention, which differ through the structure of the free radical photoinitiator (Omnirad 2959 for E4 and E5; Omnirad 184 for E8; Genocure MBF for E9; Genocure BDK for E10) and/or the structure of the diaryliodonium photoinitiator (Omnicat 440 for E4, E8, E9 and E10; Speedcure 938 for E5) are comparable.

D1. Preparation of Comparative Varnishes C6a-C11a, C6b-C11b and C12

100 g of each of the comparative hybrid UV-LED radiation curable protective varnishes C6a-C11a, C6b-C11b and C12 were prepared in the same way as described under item A1 for the varnishes E1-E3 and the comparative varnishes C1-C2, using the ingredients shown in Table 5A.

TABLE 5A

Composition of the hybrid varnishes C6a-C11a, C6b-C11b and C12

| Ingredient | Commercial name | C6a | C6b | C7a | C7b | C8a | C8b | C9a | C9b | C10a | C10b | C11a | C11b | C12 |
|---|---|---|---|---|---|---|---|---|---|---|---|---|---|---|
| Cycloaliphatic epoxide | Uvacure 1500 | 67.00 | 66.43 | 67.00 | 66.60 | 67.00 | 66.68 | 67.00 | 66.66 | 67.00 | 66.75 | 67.00 | 66.69 | 63.70 |
| Oxetane | Curalite ™Ox | | | | | | | 12.60 | | | | | | |
| Radical oligomer | Ebecryl 2959 | | | | | | | 8.00 | | | | | | |
| Antifoam agent | TEGO ® AIREX 900 | | | | | | | 0.30 | | | | | | |
| Surfactant | BYK ®-330 | | | | | | | 0.50 | | | | | | |
| Matting agent | ACEMATT ® TS 100 | | | | | | | 3.50 | | | | | | |
| Solvent | n-butanol | | | | | | | 4.00 | | | | | | |
| Diaryliodonium salt | Omnicat 440 (CP1) | | | | | | | 2.50 | | | | | | |
| Triarylsulphonium salt | Speedcure 992 (CP3) | | | | | | | | | | | | | 5.40 |
| Free radical photoinitiator | Omnirad 2959 (RP1) | | | | | | | | 1.50 | | | | | |
| Thioxanthone photosensitizer | Omnipol TX (S3) | 0.1 | 0.67 | | | | | | | | | | | |
| | Speedcure CPTX (S5) | | | 0.1 | 0.50 | | | | | | | | | |
| | Genocure* ITX (S4) | | | | | 0.1 | 0.42 | | | | | | | |
| | Genocure* DETX (S6) | | | | | | | | | 0.1 | 0.44 | | | |
| | Thioxanthone (S7) | | | | | | | | | | | 0.1 | 0.35 | |
| | Speedcure CTX (S8) | | | | | | | | | | | | 0.1 | 0.41 |
| Alternative photosensitizer | Anthracure ® UVS-1331 (S9) | | | | | | | | | | | | | 0.50 |
| Concentration reactive thioxanthone-based moiety [mmol/100 g] [a] | | 0.24 | 1.61 | 0.33 | 1.64 | 0.39 | 1.65 | 0.37 | 1.64 | 0.47 | 1.65 | 0.41 | 1.66 | — |

[a] Concentration of the reactive thioxanthone-based moiety in the varnish (mmol reactive thioxanthone-based moiety/100 g varnish).

D2. Preparation of Protective Coatings

Protective coatings were prepared from the comparative hybrid varnishes C6a-C11a, C6b-C11b, and C12 according to the invention in the same way as described under item A2.

D3. Assessment of the Curing Performance of the Comparative Hybrid Varnishes C6a-C11a, C6b-C11 b, and C12 Using the MEK Rub Test The protective coatings obtained as described at item D2 above were stored in the dark for 24 hours. After that period, the deep cure performance of each protective coating, which is indicative of the curing properties of the varnish used for obtaining said protective varnish, was assessed as described under item A3 above. The results of the test are displayed in Table 5B.

TABLE 5B

Results of the MEK rub test

| Varnish | C6a | C6b | C7a | C7b | C8a | C8b | C9a | C9b | C10a | C10b | C11a | C11b | C12 |
|---|---|---|---|---|---|---|---|---|---|---|---|---|---|
| Relative humidity [% rH] | 37 | 45 | 37 | 45 | 37 | 45 | 37 | 45 | 37 | 57 | 37 | 57 | 57 |
| Curing [a] | poor | acceptable | poor | optimal | poor | acceptable | poor | optimal | poor | acceptable | poor | optimal | optimal |

[a] curing as determined by the MEK rub test after 24 h.

D4. Evaluation of the Fluorescence Exhibited by the Protective Coatings Having Acceptable/Optimal Curing Properties as Determined by the MEK Rub Test The fluorescence exhibited by the protective coatings obtained from varnishes having acceptable or optimal curing properties as determined by the MEK rub test i.e. the protective coatings obtained from the comparative hybrid UV-LED radiation curable protective varnishes C6b, C7b, C8b, C9b, C10b, C11b and C12 was assessed using the method described hereafter.

Table 5C presents the fluorescence results.

The comparison standards ST1 and ST3 were prepared as described under item A4, using the composition described in Table 2C, at the same time as the protective coatings for which they serve as comparison standard.

The residual fluorescence of the comparison standards ST1 and ST3 was measured at the same time as the residual fluorescence of the protective coating for which they serve as comparison standard.

TABLE 5C

Results of the fluorescence measurements

| Varnish | | C6b | C7b | C8b | C9b | C10b | C11b | C12 |
|---|---|---|---|---|---|---|---|---|
| Comparison standard | | ST1 | ST1 | ST1 | ST1 | ST3 | ST3 | ST3 |
| Fluorescence @366 nm [photons/sec] | Comparison standard | 3.1E+05 | 3.1E+05 | 3.1E+05 | 3.1E+05 | 4.2E+05 | 4.2E+05 | 4.2E+05 |
| | Protective coating | 8.4E+05 | 3.9E+05 | 5.7E+05 | 6.7E+05 | 6.7E+05 | 7.1E+05 | 3.7E+06 |
| Relative fluorescence value | | 2.7 | 1.3 | 1.9 | 2.2 | 1.6 | 1.7 | 8.8 |
| Fluorescence @254 nm [photons/sec] | Comparison standard | 3.0E+05 | 3.0E+05 | 3.0E+05 | 3.0E+05 | 4.0E+05 | 4.0E+05 | 4.0E+05 |
| | Protective coating | 2.9E+06 | 7.0E+05 | 7.6E+05 | 9.7E+05 | 9.3E+05 | 1.0E+06 | 4.7E+06 |
| Relative fluorescence value | | 9.9 | 2.4 | 2.6 | 3.3 | 2.3 | 2.5 | 11.8 |

The fluorescence of the protective coatings obtained from the comparative hybrid UV-LED radiation curable protective varnishes C6b, C7b, C8b, C9b, C10b, C11b and C12 was also visually assessed using a CAMAG UV Cabinet 4 (equipped with two UV tubes at 254 nm and 366 nm, 8 W each). The visual perception was correlated with the measured relative fluorescence value determined as described under item A4, Table 2E above. Protective varnishes are usually applied on the whole surface and on both sides of the security document. Hence, protective coatings exhibiting a relative fluorescence higher than 1.6 (compared to the comparison standard ST1 and ST3) tend to make the visual observation and/or machine readability of luminescent security features present in said security document difficult or even impossible.

As shown by the experiments conducted with the comparative varnishes C6a, C7a, C8a, C9a, C10a and C11a, hybrid varnishes containing a thioxanthone containing photosensitizer other than a photosensitizer of general formula (I) as described herein in low amounts suffer from poor curing properties and result in insufficiently cured coatings using curing conditions suitable for industrial coating processes.

As shown by the experiments conducted with the comparative varnishes C6b, C7b, C8b, C9b, C10b and C11b, hybrid varnishes comprising a reactive thioxanthone-based moiety containing photosensitizer other than a photosensitizer of general formula (I), wherein the concentration of the reactive thioxanthone-based moiety is within the claimed range, have a good curing performance, but generate a protective coating exhibiting too high fluorescence, particularly at 254 nm.

As shown by the experiments conducted with the comparative varnish C12, a hybrid UV-LED radiation curable protective varnish comprising a sulfonium photoinitiator instead of a diaryl iodonium photoinitiator and 9, 10-dibutoxyanthracene as photosensitizer have a good curing performance, but yield protective coatings showing extremely high fluorescence.

The invention claimed is:

1. A hybrid UV-LED radiation curable protective varnish comprising:
   a) from about 60 wt-% to about 85 wt-% of either a cycloaliphatic epoxide, or a mixture of a cycloaliphatic epoxide and one or more cationically curable monomers other than the cycloaliphatic epoxide;
   b) from about 3 wt-% to about 15 wt-% of one or more radically curable monomers and/or oligomers;
   c) from about 1 wt-% to about 6 wt-% of a diaryl iodonium salt;
   d) from about 0.5 wt-% to about 3 wt-% of a free radical photoinitiator selected from the group consisting of alpha-hydroxyketones, alpha-alkoxyketones, benzyl diketals, benzoin ethers, phosphine oxides, phenylglyoxylates, and mixtures thereof;
   e) from about 0.01 wt-% to about 5 wt-% of a non-ionic surfactant; and
   f) a photosensitizer of general formula (I)

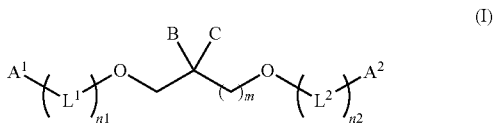

(I)

wherein in the general formula (I)
either
   i) $A^1$ and $A^2$ are independently of each other selected from hydrogen and a moiety of the following structure

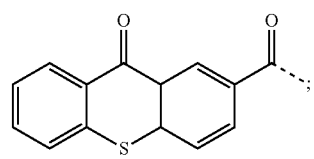

-L¹- is selected from

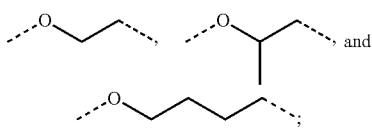, and

-L²- is selected from

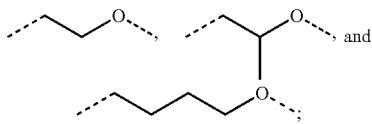, and n1 and n2 are integers higher than or equal to 0;
and
either
m represents 0;
B represent hydrogen;
C is selected from hydrogen,

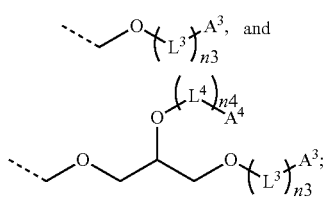

A³ and A⁴ are independently of each other selected from hydrogen and a moiety of the following structure:

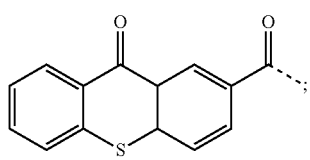

-L³- and -L⁴- are independently of each other selected from

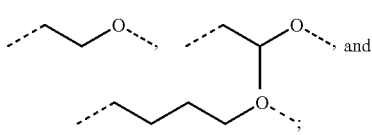, and and n3, and n4 are integers higher than or equal to 0, wherein
the sum n1+n2 is comprised between 2 and 8;
the sum n1+n2+n3 is comprised between 3 and 12; and
the sum n1+n2+n3+n4 is comprised between 4 and 16;
or
m represents 1;
B is selected from ethyl, and

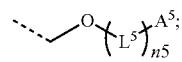

C is selected from

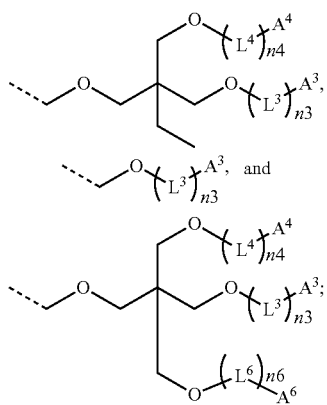

A³, A⁴, A⁵ and A⁶ are independently of each other selected from hydrogen and a moiety of the following structure:

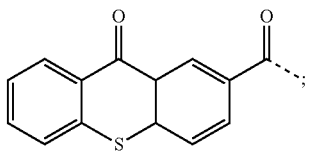

-L³-, -L⁴-, -L⁵- and -L⁶- are independently of each other selected from

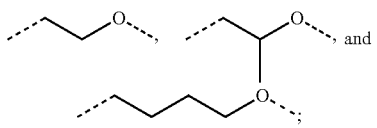, and and n3, n4, n5 and n6 are integers higher than or equal to 0, wherein
the sum n1+n2+n3 is comprised between 3 and 12;
the sum n1+n2+n3+n4 is comprised between 4 and 16;
the sum n1+n2+n3+n4+n6 is comprised between 5 and 15;
the sum n1+n2+n3+n5 is comprised between 4 and 16;
the sum n1+n2+n3+n4+n5 is comprised between 5 and 15;
the sum n1+n2+n3+n4+n5+n6 is comprised between 6 and 18;
wherein the UV-LED radiation curable protective varnish comprises a concentration of the moiety

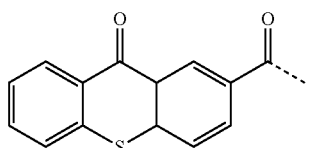

present in the photosensitizer of general formula (I) from about 1.3 mmol to about 3.2 mmol of said moiety per 100 g of hybrid UV-LED radiation curable protective varnish; or ii) $A^1$ and $A^2$ are independently of each other selected from hydrogen and a moiety of the following structure

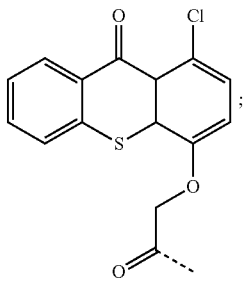

-$L^1$- is selected from

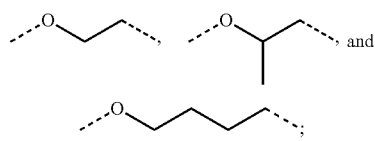

-$L^2$- is selected from

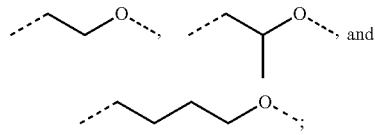

n1 and n2 are integers higher than or equal to 0; and
either
m represents 0;
B represent hydrogen;
C is selected from hydrogen,

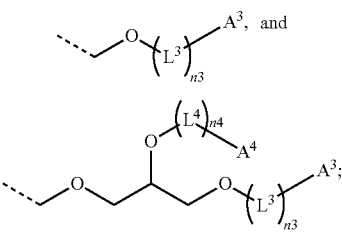

$A^3$ and $A^4$ are independently of each other selected from hydrogen and a moiety of the following structure:

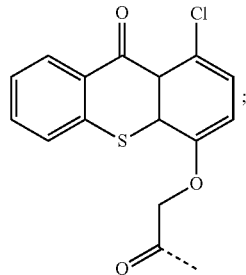

-$L^3$- and -$L^4$- are independently of each other selected from

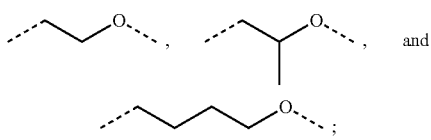

and n3, and n4 are integers higher than or equal to 0, wherein
the sum n1+n2 is comprised between 2 and 8;
the sum n1+n2+n3 is comprised between 3 and 12; and
the sum n1+n2+n3+n4 is comprised between 4 and 16;
or
m represents 1;
B is selected from ethyl, and

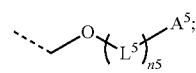

C is selected from

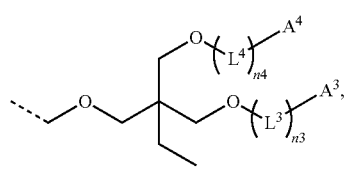

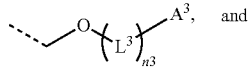

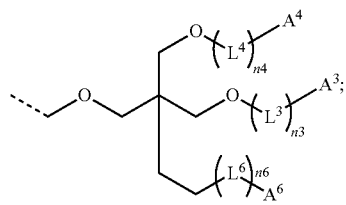

$A^3$, $A^4$, $A^5$ and $A^6$ are independently of each other selected from hydrogen and a moiety of the following structure:

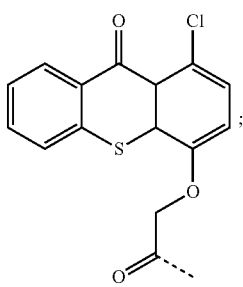

$-L^3$-, $-L^4$-, $-L^5$- and $-L^6$- are independently of each other selected from

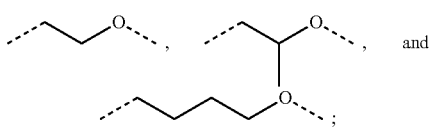

and n3, n4, n5 and n6 are integers higher than or equal to 0, wherein
the sum n1+n2+n3 is comprised between 3 and 12;
the sum n1+n2+n3+n4 is comprised between 4 and 16;
the sum n1+n2+n3+n4+n6 is comprised between 5 and 15;
the sum n1+n2+n3+n5 is comprised between 4 and 16;
the sum n1+n2+n3+n4+n5 is comprised between 5 and 15;
the sum n1+n2+n3+n4+n5+n6 is comprised between 6 and 18;
wherein the UV-LED radiation curable protective varnish comprises a concentration of the moiety

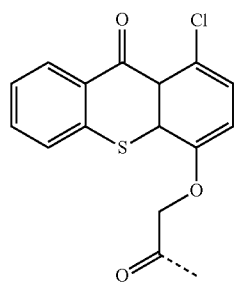

present in the photosensitizer of general formula (I) from about 1.3 mmol to about 2.6 mmol of said moiety per 100 g of hybrid UV-LED radiation curable protective varnish; wherein the weight percents are based on the total weight of the hybrid UV-LED radiation curable protective varnish.

2. The hybrid UV-LED radiation curable protective varnish according to claim 1, wherein
- $L^1$- represents

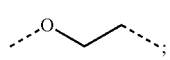

represent

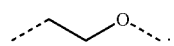

3. The hybrid UV-LED radiation curable protective varnish according to claim 1, wherein
- $L^1$- represents

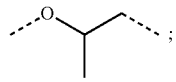

and $-L^2$-, $-L^3$-, $-L^4$-, $-L^5$- and $-L^6$-represent

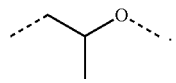

4. The hybrid UV-LED radiation curable protective varnish according to claim 1, wherein the photosensitizer is of general formula (I-a)

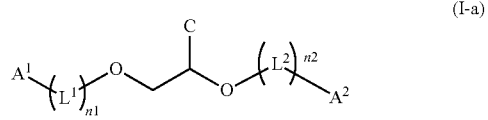

(I-a)

wherein
$A^1$, $A^2$, C, n1 and n2 have the meanings defined in claim 1, and
- $L^1$- and -$L^2$- have the meanings as defined in claim 1.

5. The hybrid UV-LED radiation curable protective varnish according to claim 1, wherein the photosensitizer is of general formula (I-b)

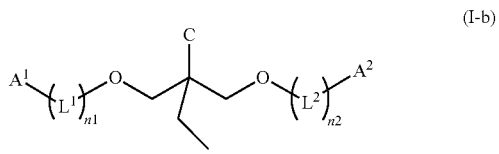

(I-b)

wherein
$A^1$, $A^2$, C, n1 and n2 have the meanings defined in claim 1, and
-$L^1$- and -$L^2$- have the meanings as defined in claim 1.

6. The hybrid UV-LED radiation curable protective varnish according to claim 1, wherein the photosensitizer is of general formula (I-c)

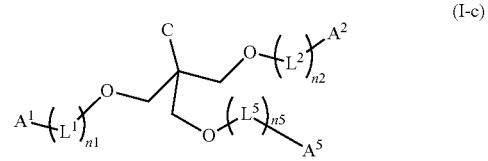

(I-c)

wherein $A^1$, $A^2$, $A^5$, C, n1, n2 and n5 have the meanings defined in claim 1, and $-L^1-$, $-L^2-$ and $-L^5-$ have the meanings as defined in claim 1.

7. The hybrid UV-LED radiation curable protective varnish according to claim 1, wherein C represents

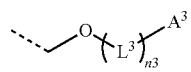

wherein $A^3$ and n3 have the meanings defined in claim 1, and $-L^3-$ has the meaning as defined in claim 1.

8. The hybrid UV-LED radiation curable protective varnish according to claim 1, wherein the diaryl iodonium salt is of general formula (II)

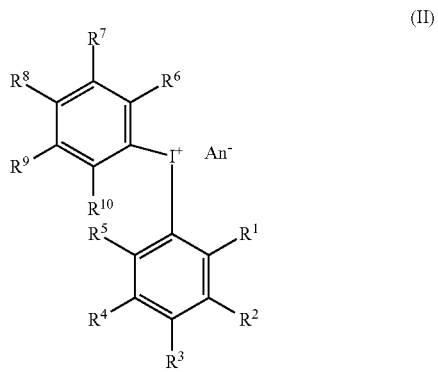

(II)

wherein $R^1-R^{10}$ are independently of each other selected from hydrogen, a $C_1-C_{18}$-alkyl group, and $C_1-C_{12}$-alkyloxy group; and $An^-$ is an anion selected from $BF_4^-$, $B(C_6F_5)_4^-$, $PF_6^-$, $AsF_6^-$, $SbF_6^-$, $CF_3SO_3^-$, $(CH_3C_6H_4)SO_3^-$, $(C_4F_9)SO_3^-$, $(CF_3)CO_2^-$, $(C_4F_9)CO_2^-$, and $(CF_3SO_2)_3C^-$.

9. The hybrid UV-LED radiation curable protective varnish according to claim 1, wherein the one or more cationically curable monomers other than the cycloaliphatic epoxide are selected from the group consisting of: vinyl ethers, propenyl ethers, cyclic ethers other than a cycloaliphatic epoxide, lactones, cyclic thioethers, vinyl thioethers, propenyl thioethers, hydroxyl-containing compounds, and mixtures thereof.

10. The hybrid UV-LED radiation curable protective varnish according to claim 1, wherein the free radical photoinitiator is selected from the group consisting of alpha-hydroxyketones, benzyl diketals, phenylglyoxylates, and mixtures thereof.

11. The hybrid UV-LED radiation curable protective varnish according to claim 1, wherein the varnish is selected from a flexography printing varnish, an inkjet printing varnish, and a screen printing varnish.

12. A process for coating a security document comprising a substrate and one or more security features applied on or inserted into a portion of the substrate, wherein said process comprises the following steps:

i) applying the hybrid UV-LED radiation curable protective varnish according to claim 1 on a surface of the substrate and/or a surface of the one or more security features of the security document so as to form a varnish layer; and ii) curing the varnish layer by exposure to UV light emitted by a UV-LED source so as to form a protective coating covering the surface of the substrate and/or the surface of the one or more security features of the security document.

13. A security document comprising a substrate, one or more security features applied on or inserted into a portion of the substrate, and a protective coating covering a surface of the substrate and/or a surface of the one or more security features of the security document, wherein the protective coating is obtained by the process according to claim 12.

14. The security document according to claim 13, wherein the security document is selected from banknotes, deeds, tickets, checks, vouchers, fiscal stamps, tax labels, agreements, and identity documents, such as passports, identity cards, visas, bank cards, credit cards, transaction cards, access documents, and entrance tickets.

15. The process for coating a security document according to claim 12, wherein applying the hybrid UV-LED radiation curable protective varnish is performed using a printing method selected from the group consisting of inkjet printing, flexography printing, and screen printing.

* * * * *